(12) United States Patent
Grober

(10) Patent No.: US 6,611,662 B1
(45) Date of Patent: Aug. 26, 2003

(54) AUTONOMOUS, SELF LEVELING, SELF CORRECTING STABILIZED PLATFORM

(76) Inventor: David E. Grober, 616 Venice Blvd., Marina del Rey, CA (US) 90291

(*) Notice: Subject to any disclaimer, the term of this patent is extended or adjusted under 35 U.S.C. 154(b) by 0 days.

(21) Appl. No.: 09/579,723

(22) Filed: May 26, 2000

Related U.S. Application Data

(60) Provisional application No. 60/136,756, filed on May 28, 1999.

(51) Int. Cl.[7] .............................................. G03B 17/00
(52) U.S. Cl. ....................................... 396/55; 396/421
(58) Field of Search ................. 396/7, 12, 13, 396/419, 428, 55, 52, 421; 74/5.22, 5.34, 5.4

(56) References Cited

U.S. PATENT DOCUMENTS

| | | | | |
|---|---|---|---|---|
| 3,638,502 A | | 2/1972 | Leavitt et al. ................ | 74/5.34 |
| 3,781,786 A | * | 12/1973 | Larrimore ................... | 340/985 |
| 3,811,329 A | * | 5/1974 | White ......................... | 74/5.41 |
| 3,840,265 A | * | 10/1974 | Stirling et al. ................ | 296/19 |
| 4,070,674 A | * | 1/1978 | Buell et al. .................. | 342/117 |
| 4,214,372 A | | 7/1980 | Rusbach ...................... | 33/252 |
| 4,625,938 A | | 12/1986 | Brown ........................ | 248/550 |
| 4,828,376 A | | 5/1989 | Padera ........................ | 350/500 |
| 4,989,466 A | | 2/1991 | Goodman ..................... | 74/5.22 |
| 5,050,087 A | * | 9/1991 | Walrath et al. ................ | 701/4 |
| 5,124,938 A | | 6/1992 | Algrain ....................... | 364/566 |
| 5,142,497 A | * | 8/1992 | Warrow ........................ | 367/12 |
| 5,184,521 A | | 2/1993 | Tyler .......................... | 74/5.34 |
| 5,202,695 A | | 4/1993 | Hollandsworth et al. ... | 342/359 |
| 5,332,136 A | * | 7/1994 | Rudolph ...................... | 224/185 |
| 5,419,521 A | | 5/1995 | Matthews .................... | 248/278 |
| 5,897,223 A | | 4/1999 | Tritchew et al. .............. | 396/13 |
| 6,263,160 B1 | * | 7/2001 | Lewis ......................... | 396/13 |

OTHER PUBLICATIONS

Product Brochure for PANAFLEX products.
Product Ad for SPACECAM.
Product Ad for GYRON, Model 935 by WolfeAir, Pasadena, CA May 1996.
Product Brochure and price sheet for TYLER Camera Systems.
Technical Manual for Self–Synchronous Stabilized Alidade, Sperry Marine Systemts Division, Department of the Navy, p. 137, Jan. 29, 1969.
Specification sheet for Nettmann Cam–remote with Gyron Stabilizer Module, Matthew Studio Electronics, Jun. 1997.
Product Brochure for Libra III, 3–Axis Remote Head, Geo Film Group, Van Nuys, CA.

* cited by examiner

*Primary Examiner*—Christopher Mahoney
(74) *Attorney, Agent, or Firm*—Law Offices of David L. Hoffman

(57) ABSTRACT

A stabilized platform is stabilized to compensate for motion caused by waves, currents, wind, and other motion during land, air, and sea operations of a camera. Although the stabilized platform is primarily described as useful for supporting a camera, the platform may be used to support other articles or persons. The stabilized platform includes a stabilizing system connecting a payload platform to a base. The stabilizing system including at least two motors for rotating the payload platform with respect to the base about two perpendicular axes of rotation providing the payload platform with stabilization in two dimensions. A control system stabilizes the platform based on information provided by a first sensor package or other location for sensing motion of the vehicle and a second sensor package on the platform. The use of the second sensor package allows the stabilized platform to be self correcting. A camera when mounted on the payload platform may be manually or remotely controlled.

38 Claims, 11 Drawing Sheets

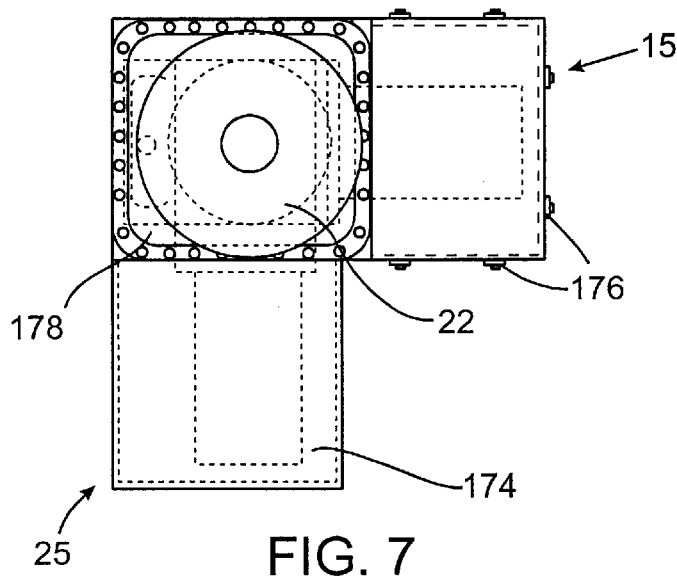
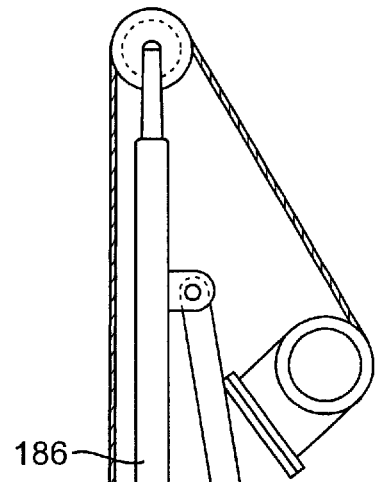
FIG. 7
FIG. 6
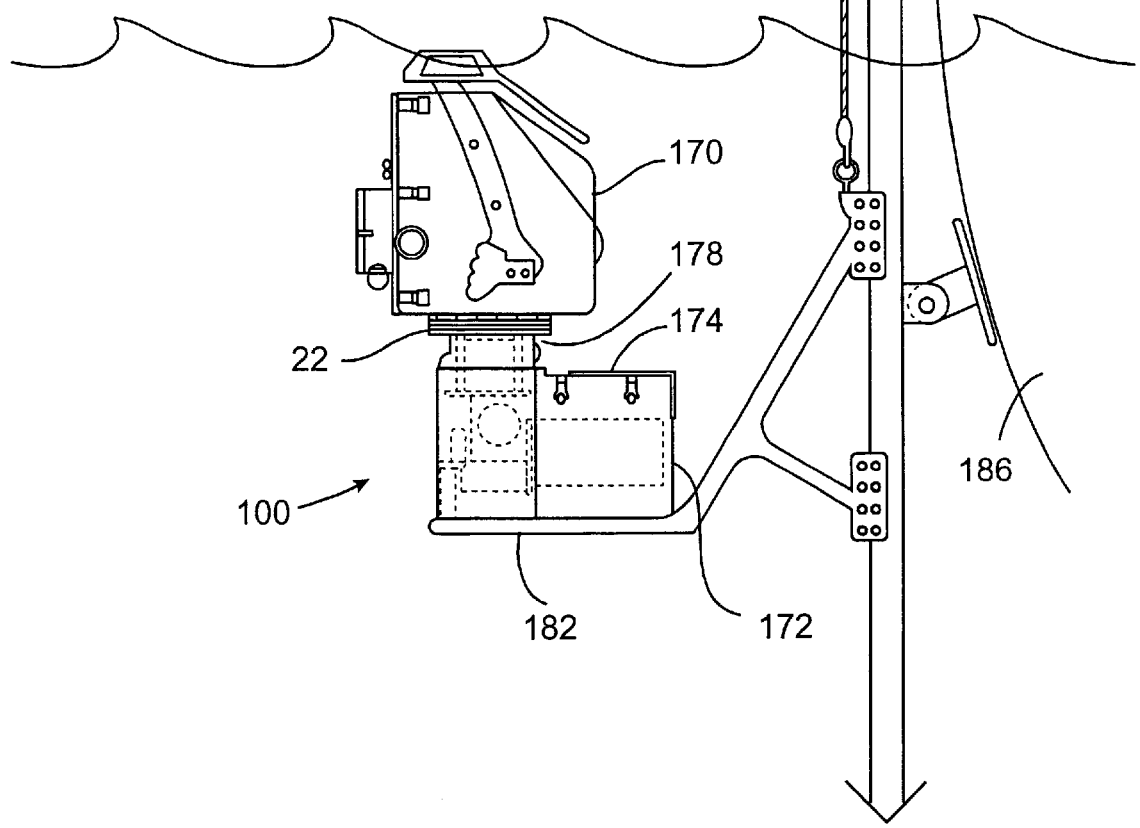

AUTONOMOUS, SELF LEVELING, SELF CORRECTING STABILIZED PLATFORM

This application claims priority based on Provisional Application Ser. No. 60/136,756 filed May 28, 1999 which is incorporated herein by reference in its entirety.

BACKGROUND OF THE INVENTION

1. Field of the Invention

The invention relates to a stabilized platform for supporting cameras, antennas, chairs, tables, and other articles, and more particularly, the invention relates to a self leveling and self correcting stabilized platform.

2. Brief Description of the Related Art

When using a camera on a vehicle such as an automobile, boat, airplane, helicopter, and the like, it is often necessary for the camera to be stabilized in some manner. Known stabilizing platforms for cameras are generally large, heavy devices using gyroscopes for stabilization.

U.S. Pat. Nos. 3,638,502; 4,989,466; and 5,184,521 describe stabilizing devices employing gyroscopes. These devices generally employ three orthogonally positioned gyroscopes to adjust for pitch, tilt, and yaw of the vehicle on which the device is mounted. The camera is mounted on or in the stabilizing device and the device maintains the camera level during motion of the vehicle. These gyroscopic stabilization platforms are quite heavy, i.e., greater than 100 pounds, due to the use of gyroscopes. The devices are particularly designed for use on helicopters and are mounted on an exterior of the helicopter. The heavy platforms add substantial weight to the helicopter, increasing fuel consumption, and decreasing the amount of time the helicopter can be airborne for a particular shoot. In addition, these gyroscopic platforms are generally able to carry only small payloads, such as cameras weighing 100 pounds or less.

Another drawback of the known gyroscopic stabilizing platforms is that they restrict operation of the camera to remote operation using remote controls, such as joysticks. Remote operation requires that the camera operator acquire a new set of skills for remote manipulation of the camera and does not allow the hands on camera control that camera operators are accustomed to using.

Non-electronic stabilizing devices, such as the Steadicam, are limited in the total weight that can be compensated for and in their range of motion.

Other stabilizing systems which have been used on ships for stabilizing sighting devices are not only heavy, but rely on the sensors in the ship's internal navigation system to drive slave alidades for stabilization. These stabilizing systems have the drawback of requiring input from the ship's navigation system.

Accordingly, it would be desirable to provide a lightweight stabilizing device which is able to carry a large payload. In addition, it would be desirable to provide a compact stabilizing device which is easily assembled and mounts using standard camera mounting plates.

It would also be desirable to provide a stabilizing platform for a camera which is independent and self-contained and removes motion caused by waves, currents, and other motion while allowing either hands on control or remote control of the camera by the camera operator.

SUMMARY OF THE INVENTION

The present invention relates to a stabilized platform for supporting payloads such as cameras, sensing devices, antennas, and persons.

In accordance with one aspect of the present invention, a stabilized platform includes a payload platform for supporting an article to be stabilized, a base, a stabilizing system connecting the payload platform to the base, a first sensor package for determining motion of a vehicle on which the stabilized platform is mounted in two perpendicular directions, a second sensor package including at least one sensor fixed to the payload platform, and a control system for stabilizing the platform based on information provided by the first sensor package and the second sensor package. The stabilizing system includes at least two motors for rotating the payload platform with respect to the base about two perpendicular axes of rotation providing the payload platform with stabilization in two dimensions.

In accordance with another aspect of the present invention, a method of stabilizing and self correcting a camera platform includes the steps of: positioning a stabilized camera platform on a moving vehicle; stabilizing the platform in at least two dimensions based on information collected by a first sensor package sensing motion of the moving vehicle; and self correcting a position of the platform based on information collected by a second sensor package mounted on the platform.

In accordance with a further aspect of the present invention, an anti-seasickness chair includes a stabilized platform configured to be mounted on a vehicle and a chair mounted on the stabilized platform. The stabilized platform includes sensors for sensing motion of the vehicle and a control system for compensating for motion of the vehicle in at least two dimensions.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 6 is a side view of a two axis stabilized platform and camera mounted on an underwater rail on the side of a boat;

FIG. 7 is a top view of the two axis stabilized platform of FIG. 6;

DETAILED DESCRIPTION OF THE PREFERRED EMBODIMENTS

Figure 1:
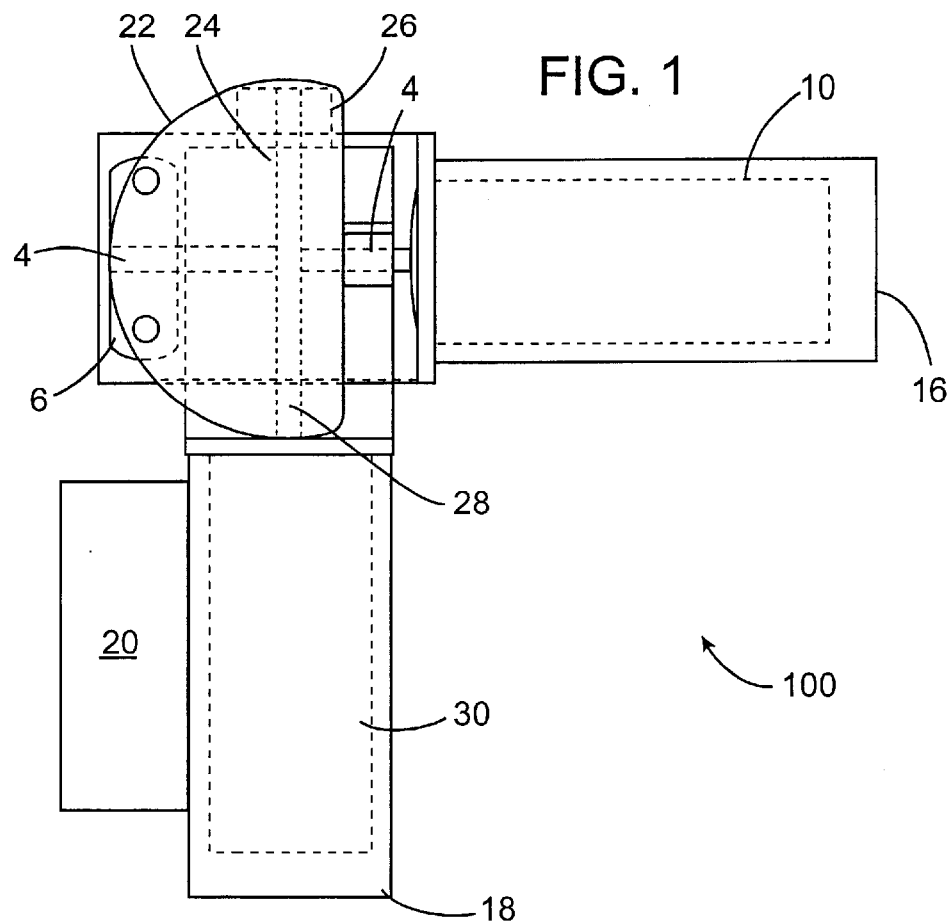
FIG. 1 is a top view of a two axis stabilized platform according to the present invention.
Figure 2:
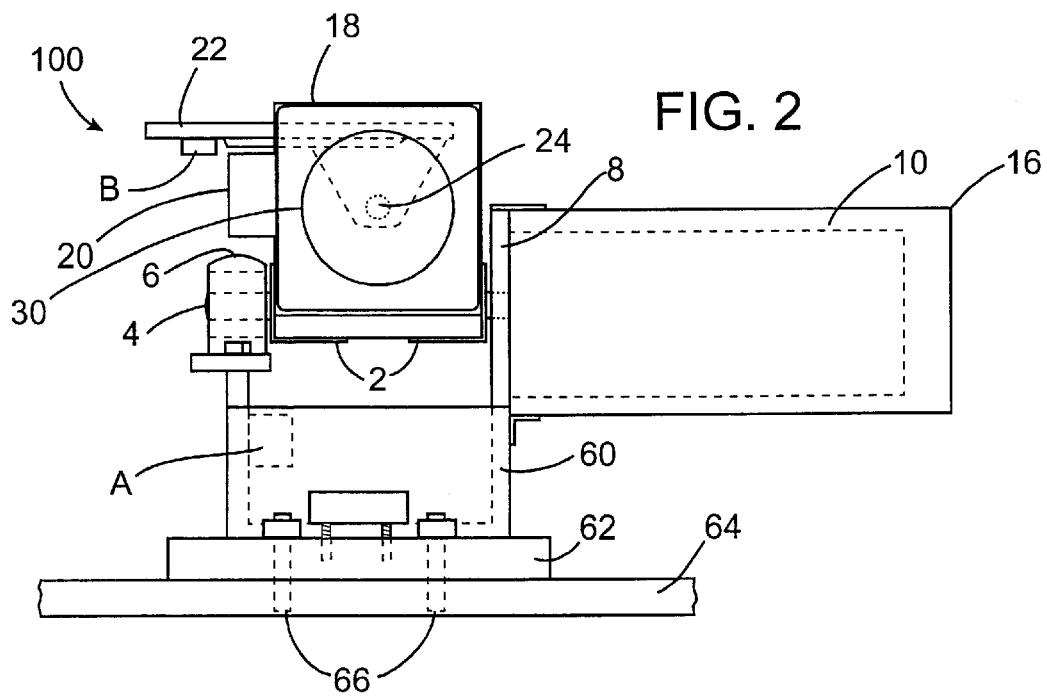
FIG. 2 is a front view of the stabilized platform of FIG. 1.

FIGS. 1 and 2 illustrate top and side views, respectively, of a two axis stabilized platform according to the present invention. The stabilized platform is stabilized to compensate for motion caused by waves, currents, wind, and other motion during land, air, and sea operations of a camera. Although the stabilized platform is primarily described as useful for supporting a camera, the platform may be used to support other articles or persons. A camera when mounted on the platform may be manually or remotely controlled.

As shown in FIGS. 1 and 2, the two axis stabilized platform 100 includes a bottom platform 2 connected to a first drive shaft 4 of a first drive mechanism 10. The drive mechanism 10 is mounted on a fixed side plate 8 connected to a mounting plate 60 of the stabilized platform 100. The first drive shaft 4 may be a single or split shaft and is supported by a bearing 6. The drive mechanism 10 preferably includes a motor and depending on the application requirements for torque and resolution, a gear box. An encoder is preferably attached to the motor and provides feedback about the position of the bottom platform 2. The encoder is preferably a high resolution encoder, such as a 1000 count encoder accurate to about 0.1 degree. A protective housing 16 preferably encloses the drive mechanism 10, including the motor, the gear box, the encoder, and may also enclose associated wiring. For use in marine operations, the protective housing 16 is preferably a waterproof housing.

A camera mounting platform 22 is supported above the bottom platform 2 on a second drive shaft 24 of a second drive mechanism 25. The camera mounting platform 22 is configured to receive the standard camera mount base of a motion picture camera. Alternatively, the mounting platform 22 may be configured to receive other types of payloads. The camera platform 22 is preferably mounted off center to prevent backlash.

Figure 3:
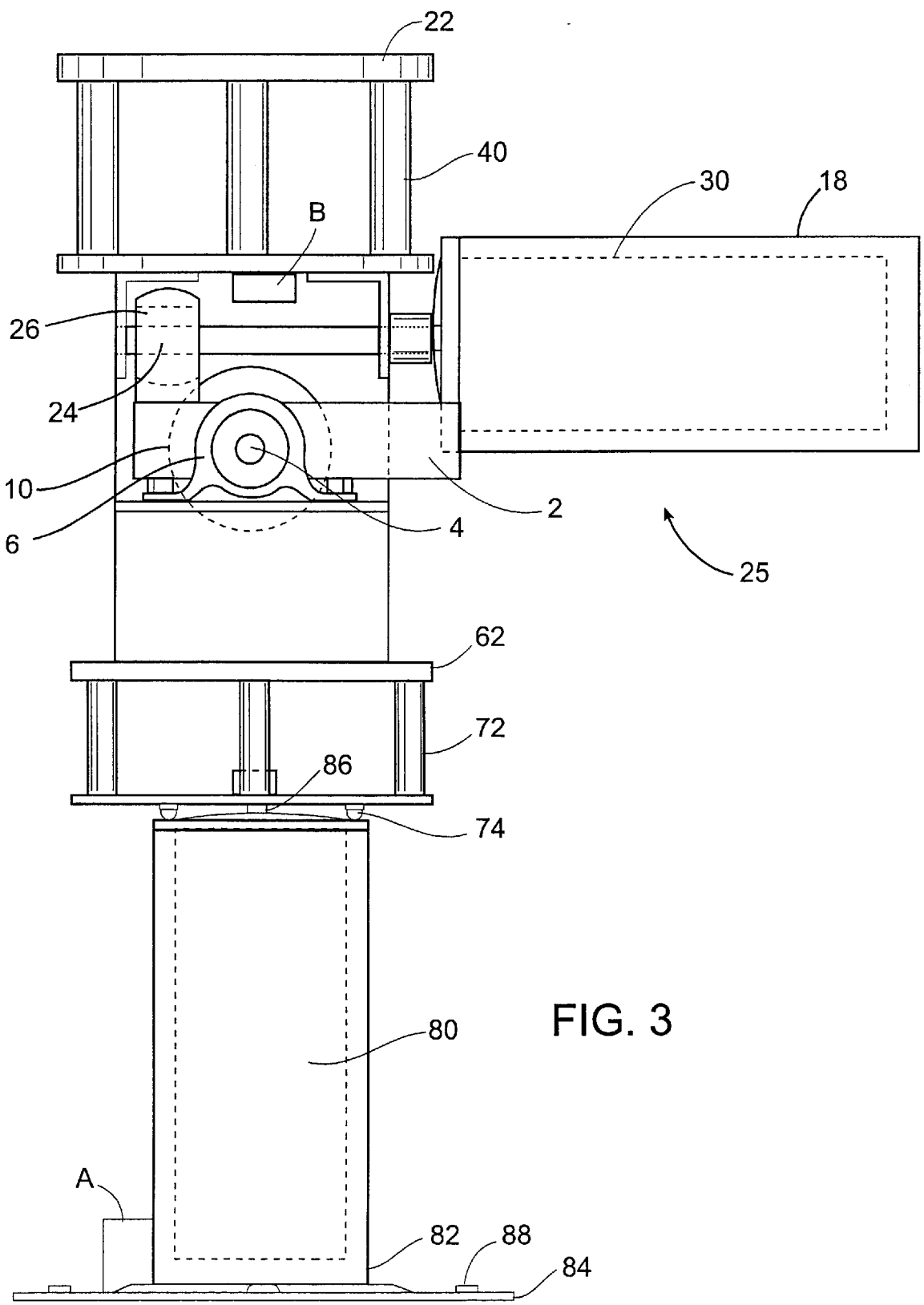
FIG. 3 is a left side view of a three axis stabilized platform according to the present invention.

The second drive mechanism 30 is mounted orthogonally to the first drive mechanism 10 and is fixed to the platform 2, as can be seen in FIG. 3. The second drive shaft 24 may be a single or split shaft mounted on a bearing 26 which is supported by the bottom platform 2. The second drive shaft 24 is orthogonal with respect to the first drive shaft 4 to achieve two-dimensional stabilization of the camera platform 22. The second drive mechanism 30 is preferably made up of a motor, and depending on the application requirements for torque and resolution, an optional gear box. An encoder of the drive mechanism 30 provides feedback about a position of the camera platform 22. A protective housing 18 preferably encloses the drive mechanism 30, and may also enclose the respective wiring. An electronic control box 20 may be connected to the protective housing 18 or to another portion of the stabilized platform for controlling the motors.

The bottom platform 2 is rotatably supported by the shaft 4 and the bearing 6 on a mounting base 60. The mounting base 60 can be attached directly to the surface of a vehicle 64 or other support using bolts 66, clamps, or other mounting apparatus. The mounting base 60 also may include a base plate 62 which is configured for connection to a standard camera mount. The base plate 62 may be attached directly to a vehicle 64, or may be connected to a tripod or other camera mounting device.

Although FIG. 2 illustrates the stabilized platform 100 in an upright configuration with the camera support platform 22 positioned horizontally for supporting a camera on top of the stabilized platform, the stabilized platform may also be used in other orientations. For example, the stabilized platform may be inverted and hung from an overhead mount with the camera suspended below the stabilized platform, mounted horizontally, or at an angled orientation.

The two drive shafts 4, 24 are positioned orthogonal to one another to provide stabilization of the camera platform 22 in two dimensions. In an upright orientation, as shown in FIG. 2, the stabilized platform compensates for pitch and roll motions of a vehicle. As will be described below with respect to FIG. 3 a third degree of motion may be provided for compensating for azimuth motion by the addition of a third orthogonally positioned drive shaft to the stabilized platform 100 of FIG. 1.

A control system for stabilizing the platform is mounted within the control box 20 either on one of the protective housings 16, 18, on the mounting base 60, or at another position on the stabilized platform 100. The control system uses information gathered from a first sensor package A and a second sensor package B for stabilizing and self correcting the camera platform 22 as will be described below. The control system is preferably a digital system but may also be an analog system.

According to one embodiment of the invention, the sensor package A is placed either on the base 60, on the platform 62, or on the vehicle 64 or other support. Sensor package A includes motion sensors such as rate sensors, gyroscopic sensors, fiber optic gyros, or other sensors for sensing motion of the base. The sensors which are selected are preferably not temperature sensitive. For the two axis stabilized platform of FIGS. 1 and 2, preferably the sensors in sensor package A are two orthogonally positioned rate type sensors sensing motion of the base 60 along two orthogonal axes. The sensor package A provides instantaneous signals to the control system at a high frequency, such as about 100 times per second or greater, preferably about 800 times per second or greater.

The sensor package B is mounted on the camera support platform 22. The sensor package B includes one or more motion sensors which provide position feedback to the control system. Preferably, the sensors in sensor package B are level sensors. For the two axis stabilized platform of FIGS. 1 and 2, preferably the sensors in the sensor package B are two orthogonally positioned sensors. Sensor package B allows the automatic correction of anomalies and allows the stabilized platform 100 to be self-leveling. In particular, the sensor package B provides information about the stabilized position of the camera platform 22 to the control system and allows the control system to automatically correct for anomalies in the sensor package A, such as gyro precision, drift, rate sensing error, and other errors in the sensing and control systems. The signals from the sensor package B are provided to the control system periodically, such as about every 0.1 to 60 seconds, preferably about every 1–2 seconds. The sensor package B allows for automatic correction of the camera platform 22 to a horizontal or other predetermined position. An operator may determine and preset the desired stabilized position of the camera platform 22 with respect to the earth's horizon and a magnetic course heading.

The use of two independent sensor packages located on the base 60 and the camera platform 22 according to the present invention provides the distinct advantage of self leveling or self correcting. Without the two sensor packages the camera platform tends 22 to drift away from an initial set position or a level position over time.

According to an alternative embodiment of the invention, the sensor packages A and B are both located on the camera platform 22. In this embodiment, certain modifications to the control system are necessary to prevent backlash in the motor and/or gear from creating a vibration of the platform.

One example of a stabilized platform 100 for use on boats and other vehicles has the capability of compensating for pitch and roll motions of about 70 to about 90 degrees, weighs less than about 40 pounds, and accepts payloads of at least 100 pounds, preferably, at least 150 pounds. The stabilized platform 100 when designed for us with aircraft, preferably has the capability of compensating for pitch, roll, and yaw motion of 360 degrees.

The embodiment of FIG. 3 adds a third axis of rotation to the stabilized platform to maintain the orientation of the camera platform 22 in an azimuth axis. According to this embodiment, a base plate 62 of the embodiment of FIGS. 1 and 2 is mounted on a rotary bearing 74 with or without a riser 72. A third drive mechanism 80 is provided including a motor, an optional gear box, and a encoder. A drive shaft 86 of the drive mechanism 80 rotates the base plate 62. A motor housing 82 is connected to a base plate 84 which may be firmly attached to a vessel, vehicle, tripod, or other support either vertically, horizontally, in an inverted position, or at other angular positions.

In the embodiment of FIG. 3, the control system obtains data from the sensor package A located on the housing 82 of the drive mechanism 45, on the base plate 84, on the vehicle, on the platform 22, or other mounting surface. The control system also receives data from the sensor package B located on the camera platform 22. A coaxial rotary joint, not shown, may be installed between the riser 72 and motor housing 82 to provide a convenient system for transmitting signals and electrical power to and from the control system. According to this embodiment, the sensor package A and sensor package B preferably each include a third sensor to recognize motion in the azimuth axis. In the arrangement of FIG. 3, the range of azimuth control of the camera platform 22 is unlimited.

Figure 10:
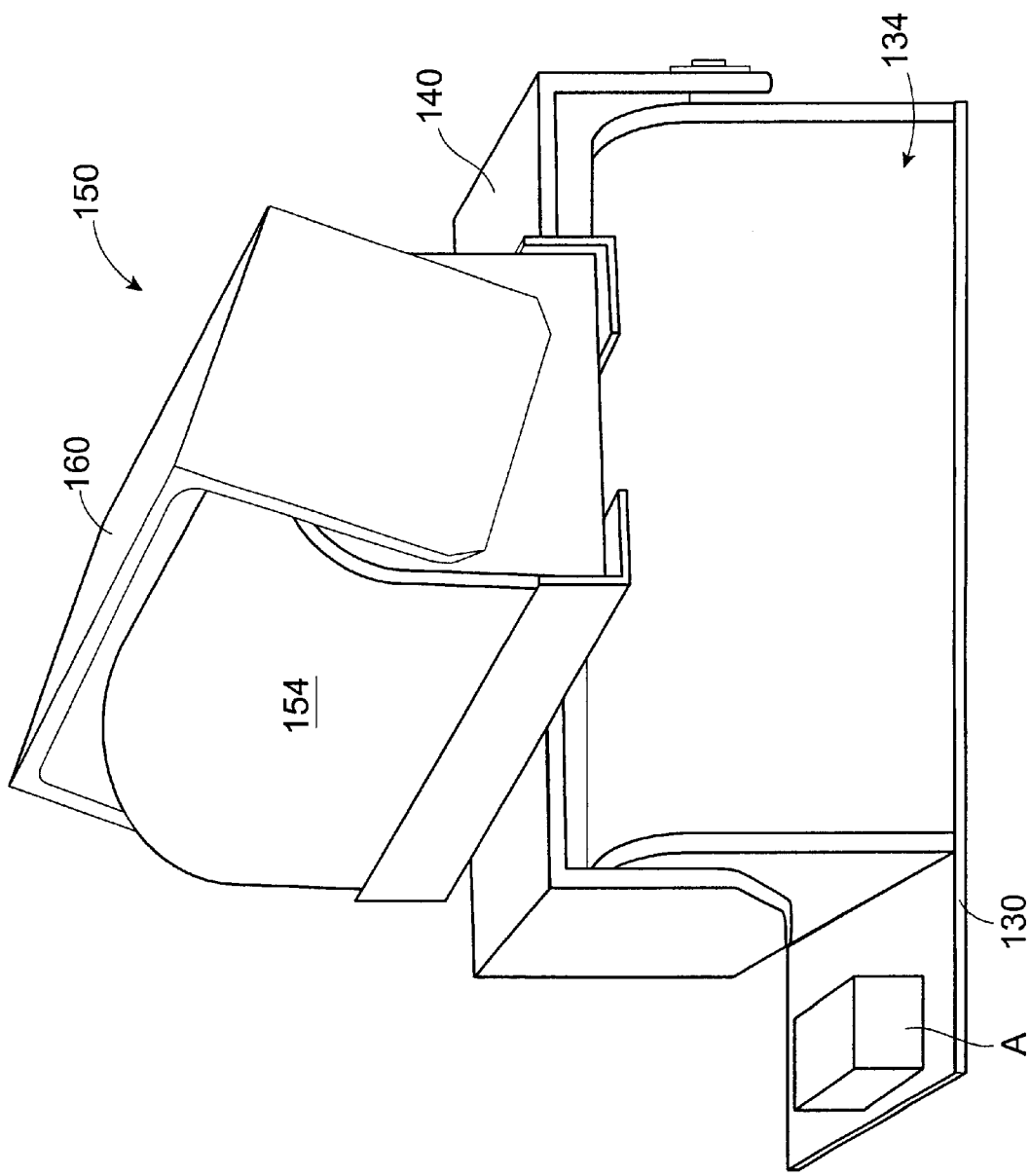
FIG. 10 is a perspective view of an alternative embodiment of a two axis stabilized platform.
Figure 12:
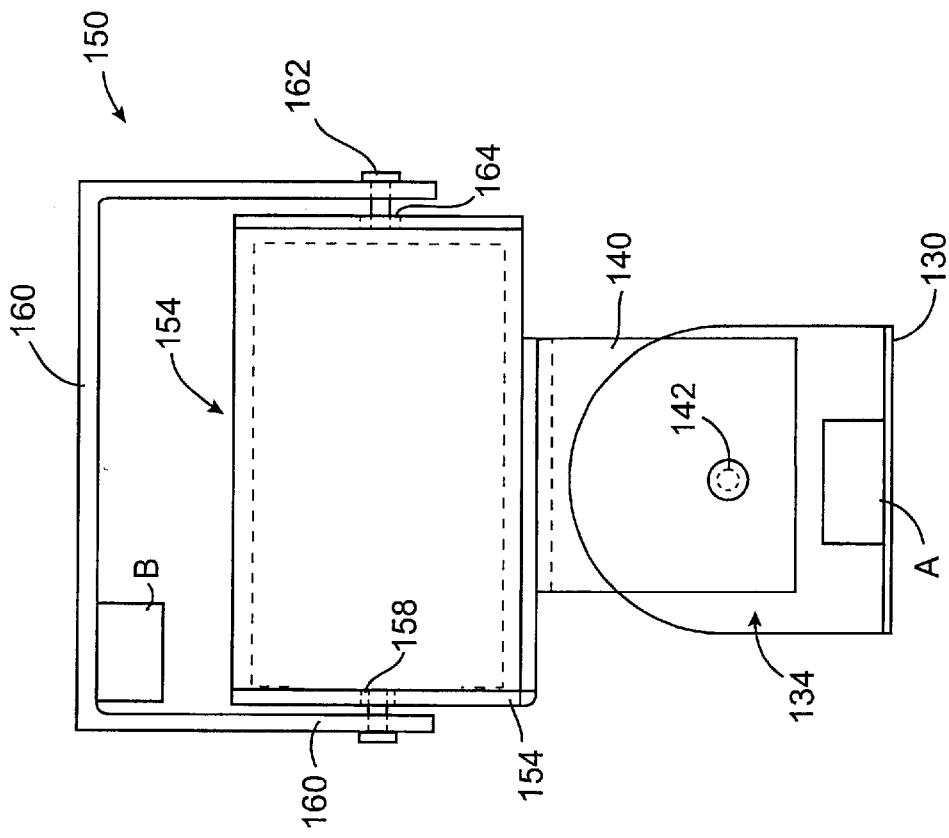
FIG. 12 is a left side view of the stabilized platform of FIG. 10.
Figure 11:
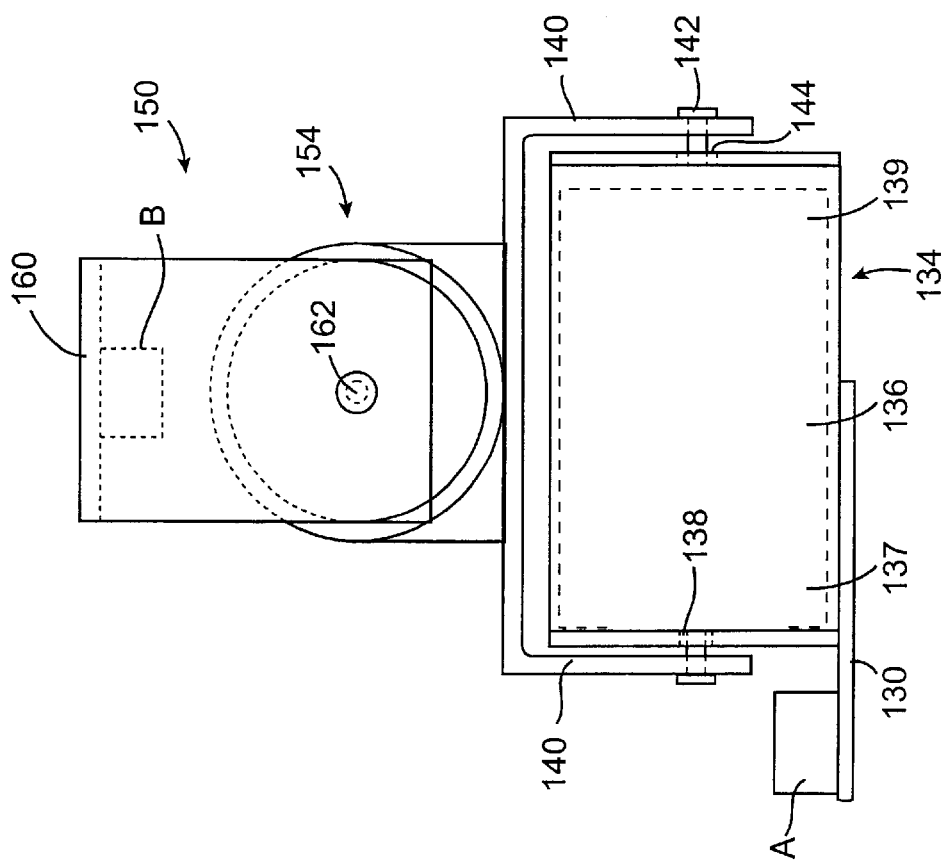
FIG. 11 is a front view of the stabilized platform of FIG. 10.

An alternative embodiment of the two axis stabilized platform 150 is illustrated in FIGS. 10–12. In this internal embodiment, the drive mechanisms are in a stacked arrangement for a more compact system in a width dimension which may be slightly larger in a height direction in the orientation illustrated in FIG. 10. According to this embodiment, a base plate bracket 130 is attached to a first drive mechanism 134 including a motor, a gear box, and encoder. A drive shaft 142 of the motor supports a first platform 140 on which is mounted a second drive mechanism 154 having an orientation which is orthogonal to the first drive mechanism 134. A drive shaft 162 of the second drive mechanism 154 supports the camera mount platform 160. Bearings 138, 144, 158, 164 are provided in the motor housings for supporting the drive shafts 142, 162.

According to this embodiment, the payload, such as a camera, is attached to the payload or camera platform 160. A first sensor package A is attached to the base plate bracket 130 while a second sensor package B is attached to the camera or payload platform 160 for operation in the manner described above. The stabilized platform 150 according to FIGS. 10–12 can be placed vertically as shown, horizontally, or inverted as well as other angled orientations.

The stabilized platform 100, 150 according to the present invention allows hands on or remote operation of the camera on the camera platform 22. For hands-on operation, a universal camera mount is mounted between the platform 22 and the camera. The universal camera mount provides the ability to move the camera in three dimensions while the platform 22 remains stable. This option of hands-on control of the camera is not available in any of the known stabilized camera platforms.

Alternatively, the camera may be remotely controlled by providing a commercially available remote-controlled universal camera mount between the stabilized platform 100 and the camera.

Figure 4:
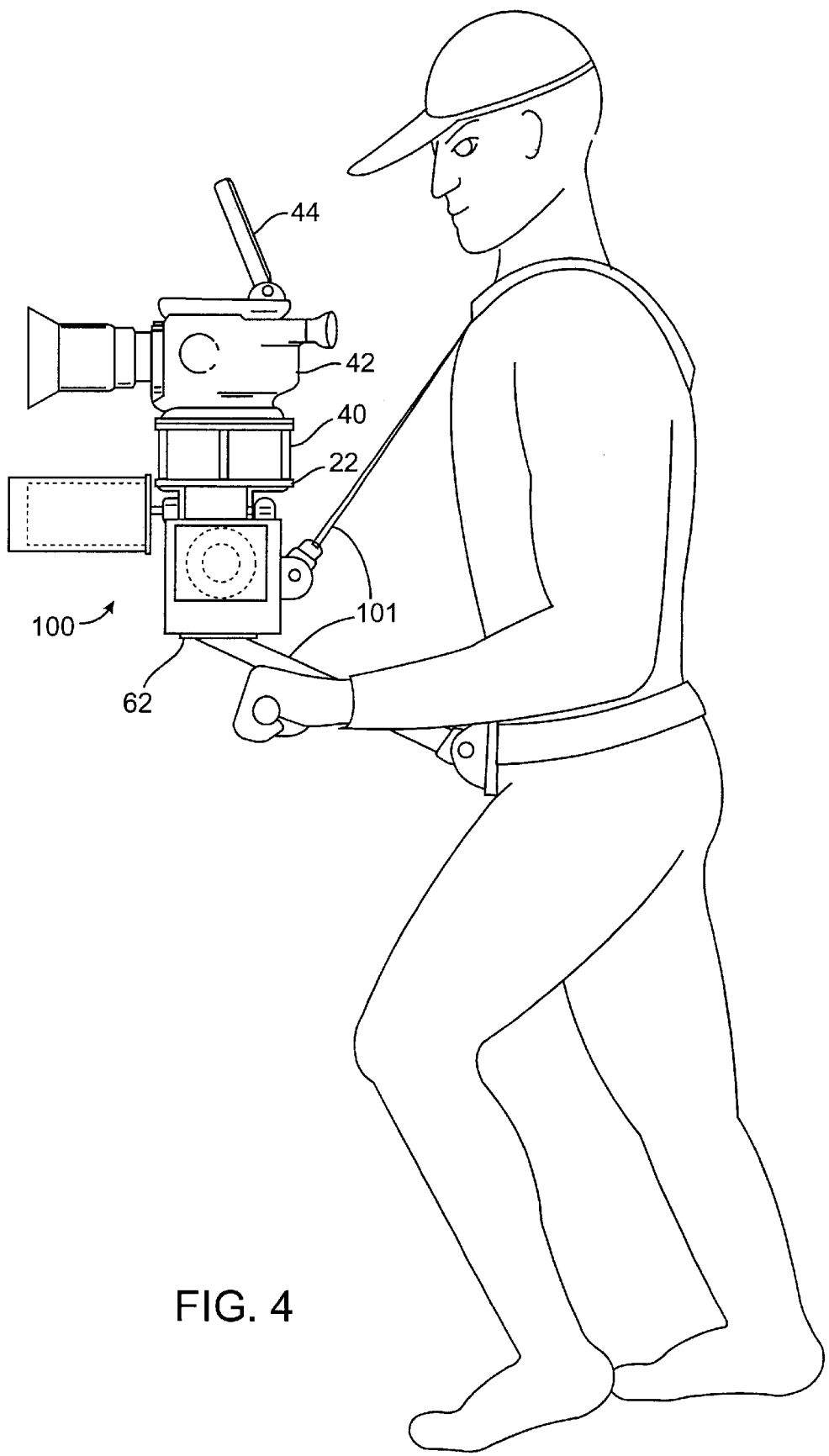
FIG. 4 is a side view of a two axis stabilized platform and camera mounted on a harness.

In addition to supporting the stabilized platform on a vehicle, tripod, or other base, the base plate of the stabilized platform 100, 150 may be attached to a suitable body harness 101 to be worn by a camera operator or assistant, as shown in FIG. 4. When mounted on the body harness 101, the stabilized platform 100 provides stabilization of the motion of the person in two or three directions during use of the camera. A camera 42, as illustrated in FIG. 4, may be mounted on the stabilized platform 100. An optional riser 40 may be provided between the stabilized platform and the camera 42 or between the stabilized platform and the harness 101 to adjust a height of the camera 42 for ease of use. The camera 42 may be provided with an external monitor 44 allowing for improved ease of viewing by the operator.

Figure 5:
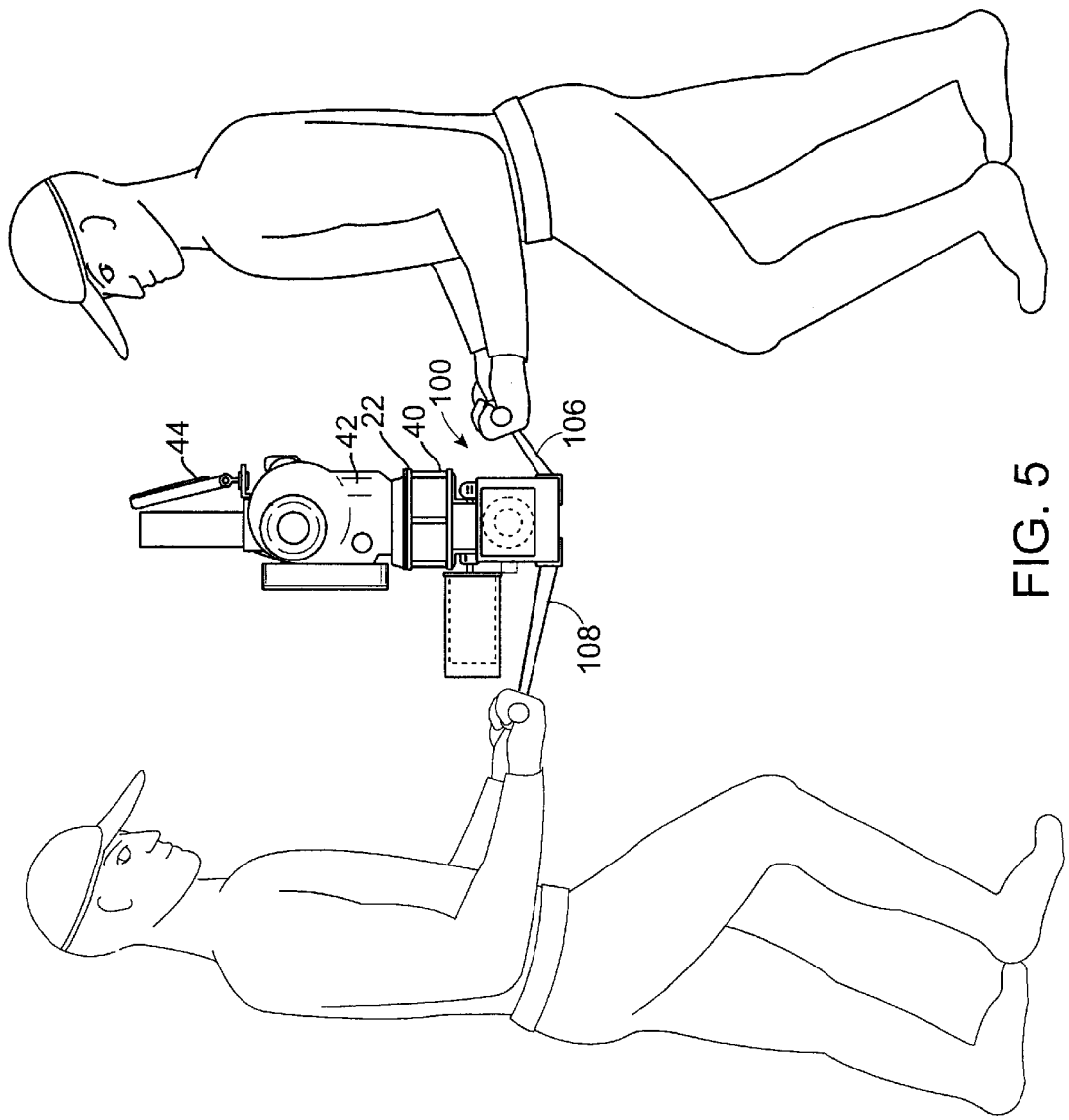
FIG. 5 is a front view of a two axis stabilized platform and camera mounted on a base having handles.

As shown in FIG. 5, as an alternative to the harness 101, various types of handles 106, 108 may be mounted on the mounting plate 62 of the stabilized platform 100. The handles 106, 108 may be rigid, flexible, or formed of an elastic material. The handle material will provide different degrees or horizontal and vertical drift resulting in a different "look" as seen by the camera lens. For example, a motion picture camera if moved toward a subject has the same object size as if a zoom lens were used and the camera remained stationary. However, the effect of the image on the film in relation to depth of field, and image quality would be vastly different. Image quality movement would likewise be creatively different by using different types of support handles 106, 108 or a dolly.

Figure 8:
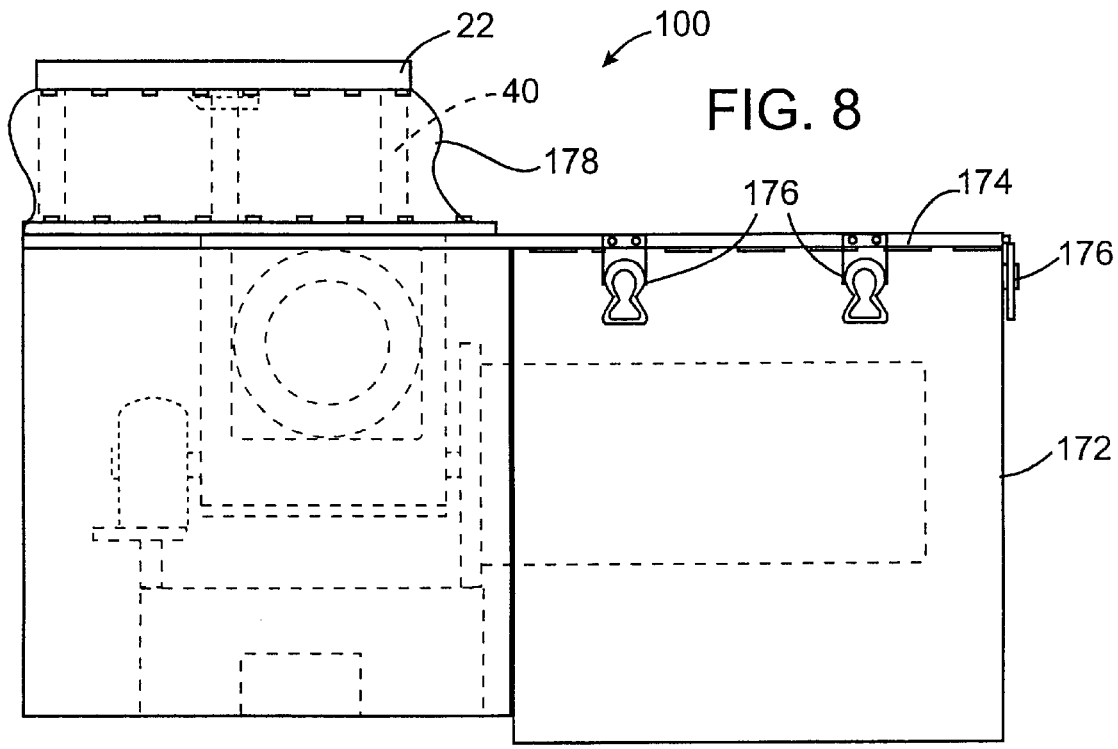
FIG. 8 is an enlarged side view of the stabilized platform of FIG. 6.

FIG. 6 illustrates a stabilized platform 100 and attached camera 170 in one example of an underwater application. As shown in FIGS. 6–8, the stabilized platform of FIG. 1 is shown encased in a waterproof housing which is generally a form fitting waterproof case 172 which fits around the stabilized platform. A lid 174 of the waterproof case is provided with a plurality of tension latches 176 and an O-ring (not shown) which is compressed between the lid and the case upon closure of the latches to prevent water from entering the case. A rubberized boot 178 is attached to one side of the lid 174. An opposite end of the rubberized boot 178 is sealed to an underside of the payload platform 22 forming a water tight seal between the payload platform and waterproof case 172. A sealed underwater camera 170 is attached to the payload platform 22.

In operation of the embodiment of FIGS. 6–9, the camera 170 and stabilized platform 100 can be mounted on a shelf 182 which is movable on a rail 184 on the exterior of a vehicle such as a boat 186. As shown in FIG. 6, the camera 170 can be lowered down the rail 184 from a pitching, rocking boat, and the stabilized platform 100 will maintain the camera with a stabile horizon as it moves from above to below the surface of the water.

Figure 13:
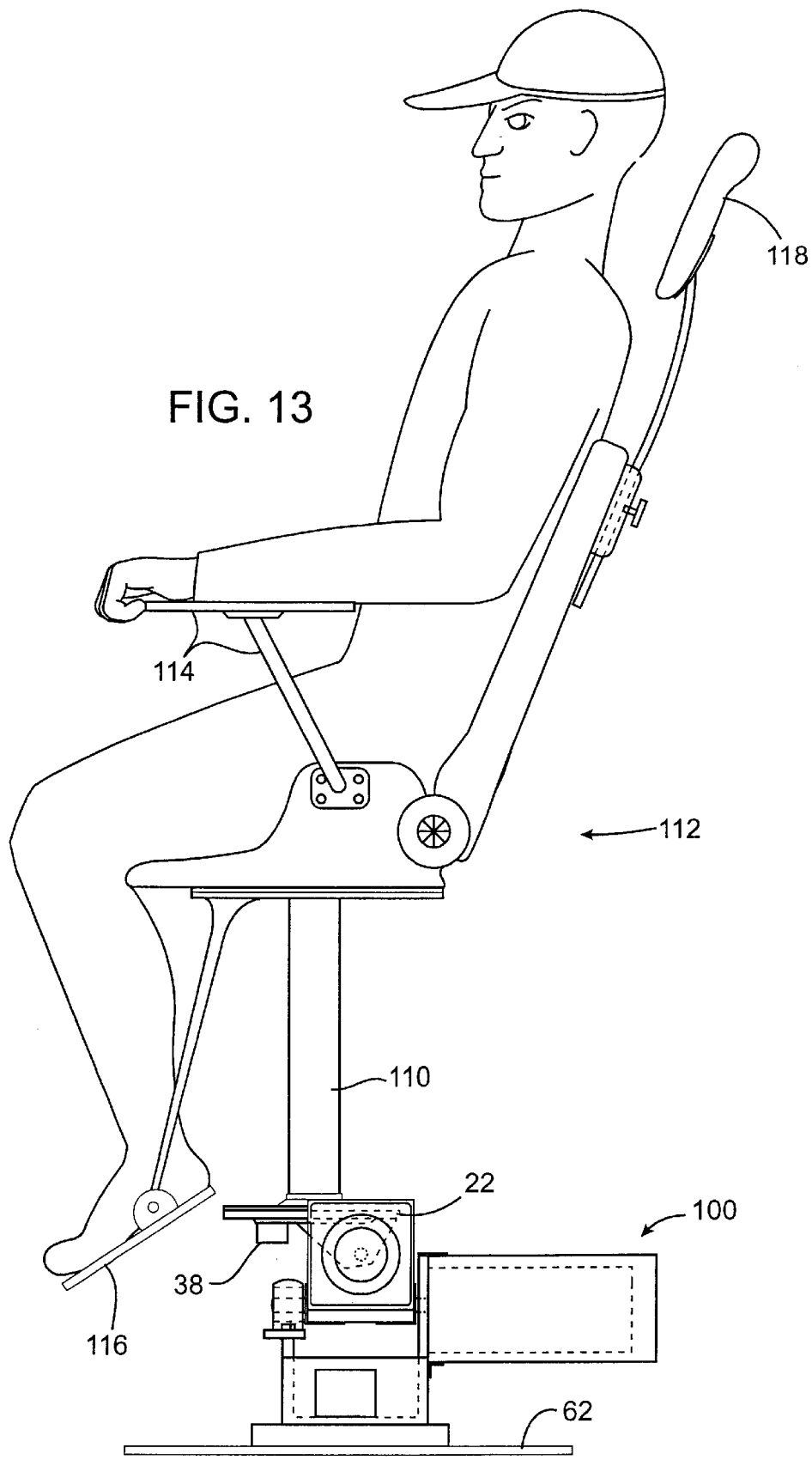
FIG. 13 is a side view of the two axis stabilized platform of FIG. 1 supporting an anti-seasickness chair.

FIG. 13 illustrates an anti-seasickness chair 112 according to the present invention. According to this embodiment, the base plate 62 of the stabilized platform 100 is attached to a vessel or vehicle deck and a chair 112 is fixed to the payload platform 22 by the post 110. The length of the post 110 and configuration of the chair 112 are variable depending on the particular application and for user comfort. An armrest or small table 114 can be attached to the chair 112, providing a stable working surface for the occupant. A footrest 116 and headrest 118 can also be added.

The anti-seasickness chair 112 of FIG. 13 can be used to eliminate two components of the motion of a moving vehicle, resulting in the occupant experiencing only one dimensional or up and down motion which is less apt to cause seasickness than motion in three dimensions.

Figure 14:
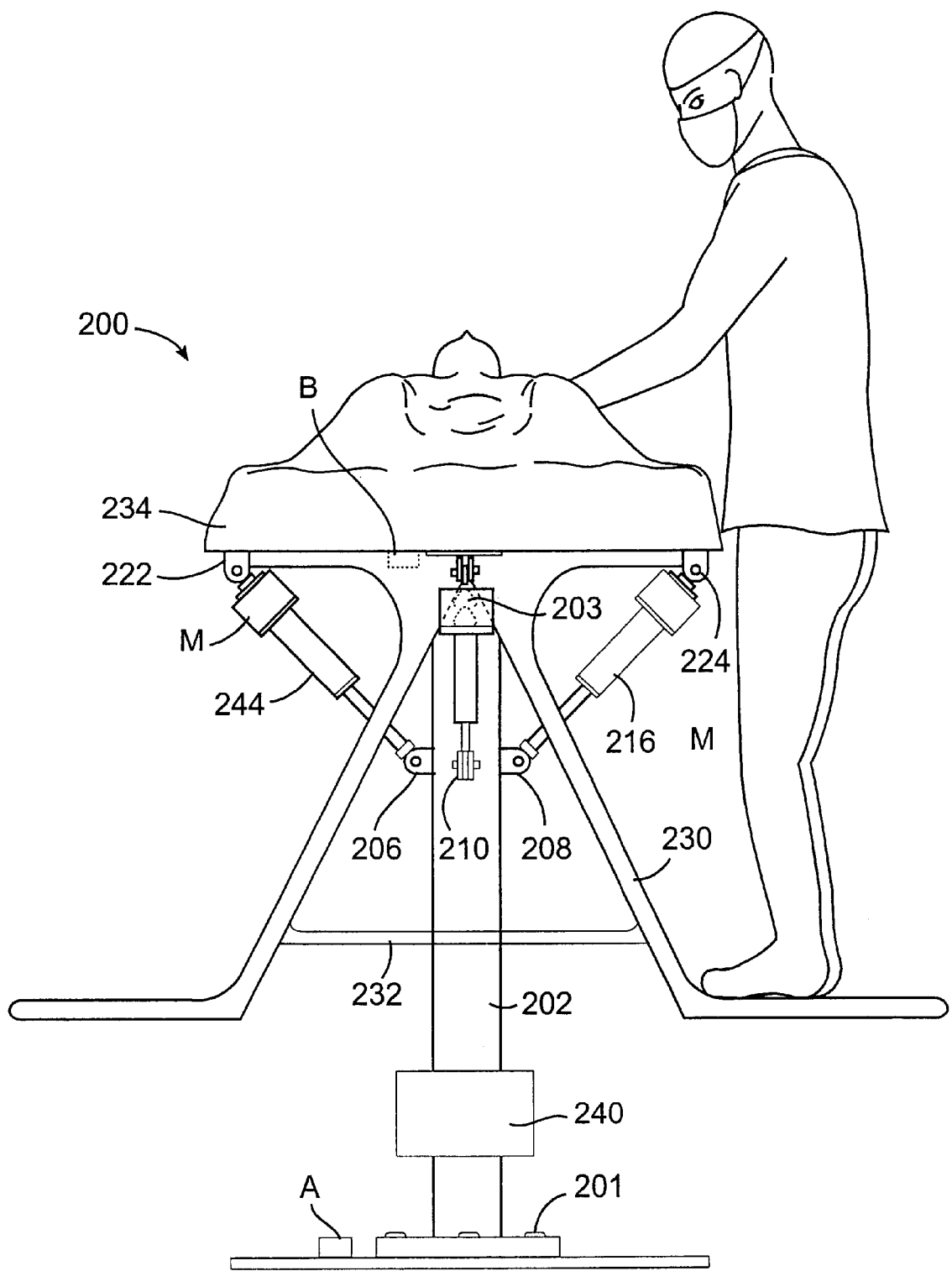
FIG. 14 is a side view of an alternative embodiment of a stabilized platform and an operating table according to the present invention.
Figure 15:
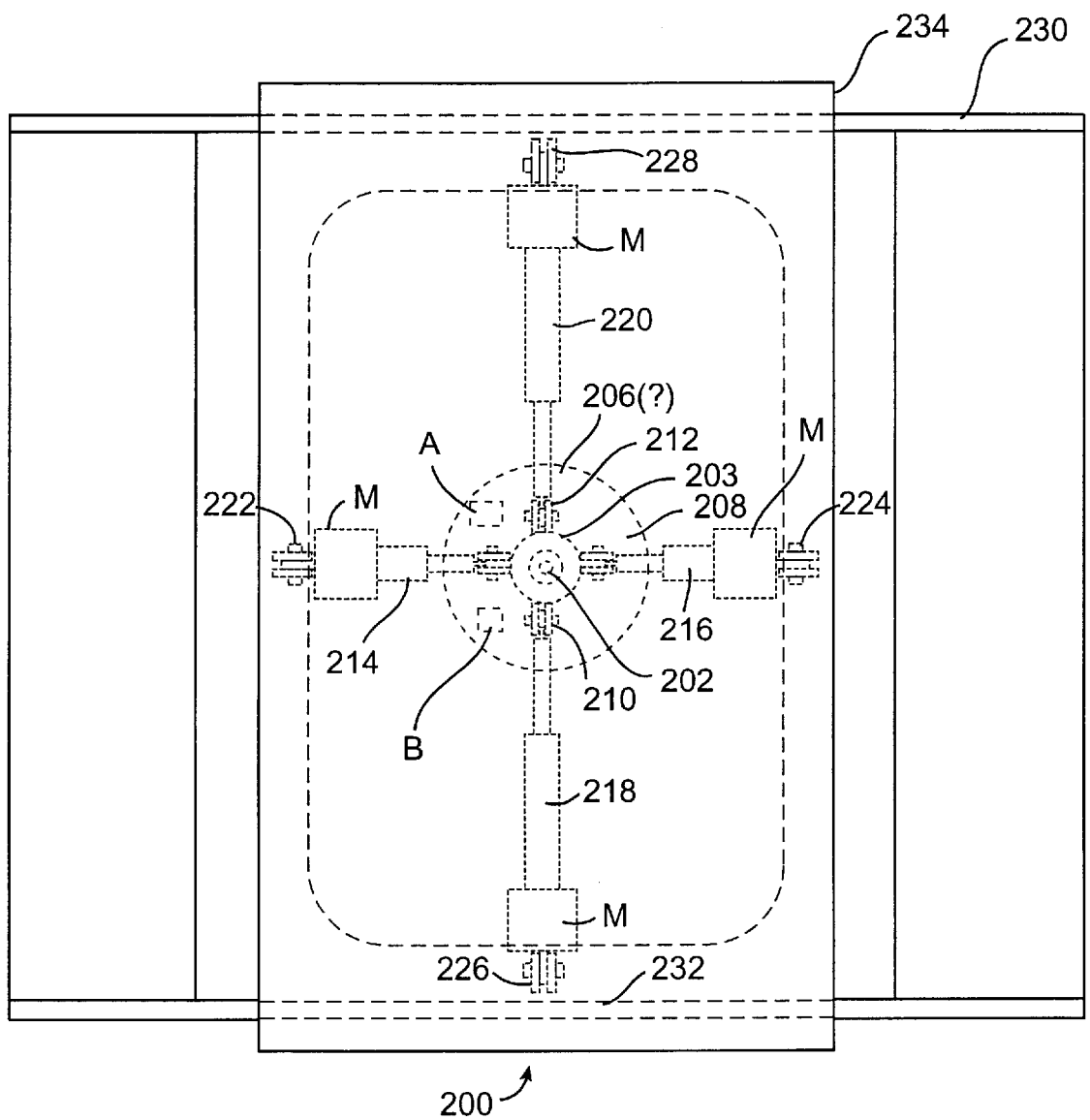
FIG. 15 is a top view of the stabilized platform and the operating table of FIG. 14.
Figure 9:
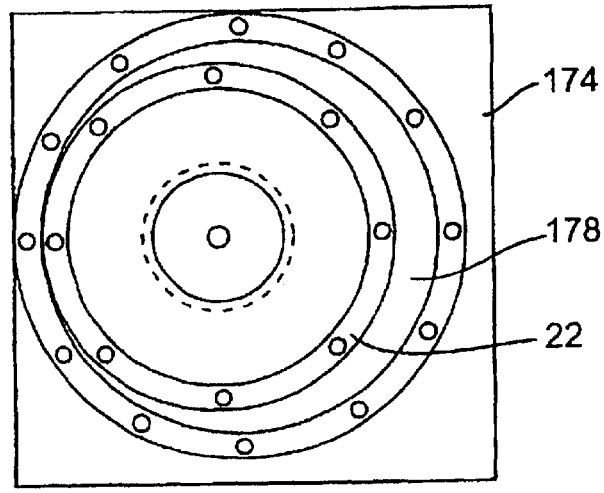
Figure 8:
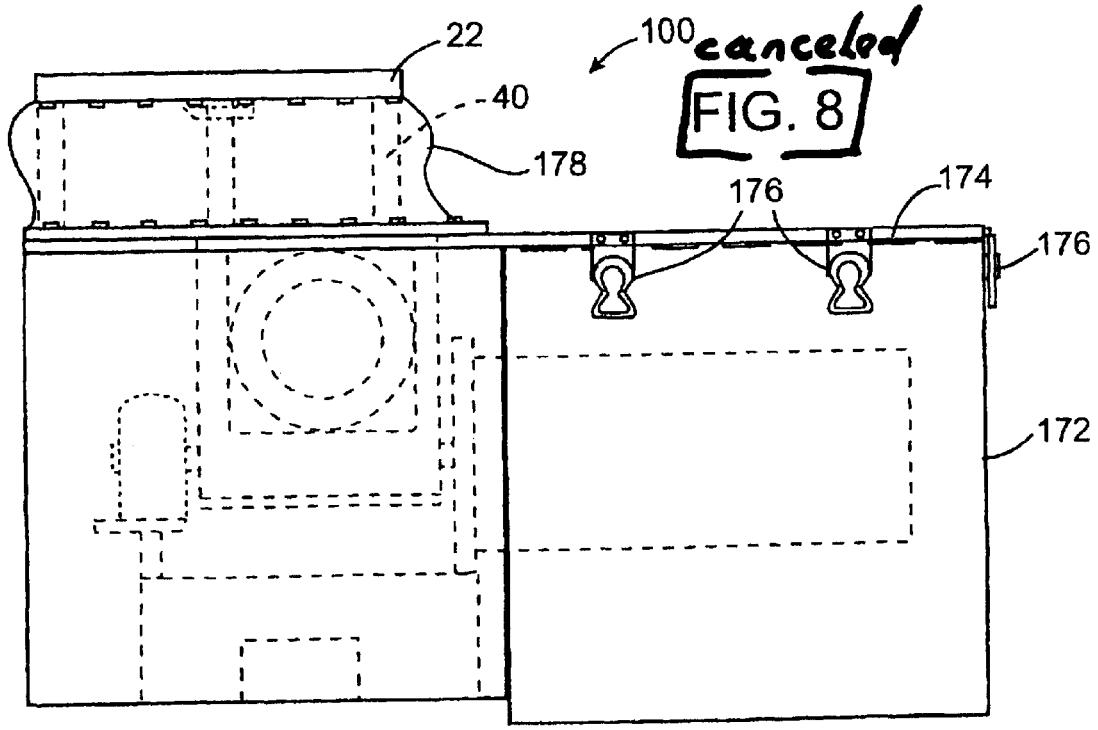
Figure 10:
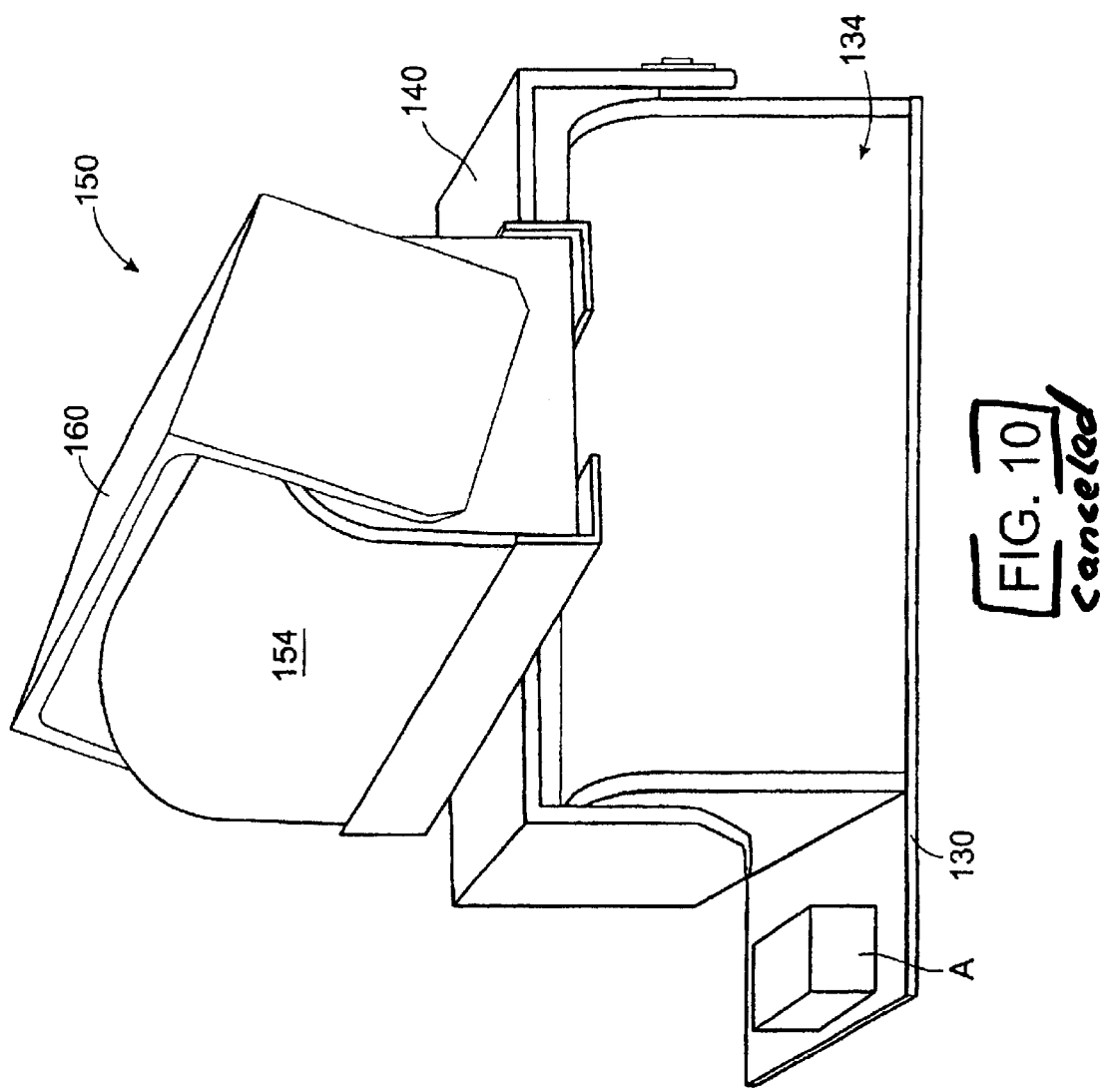

FIGS. 14 and 15 illustrate a self-stabilized hospital or operating bed 200 for use on vehicles. The self-stabilized bed 200 includes a pedestal base plate 201 which is firmly secured to the floor of a boat or other vehicle. A rigid post 202 is attached to the base plate 201 and supports a universal joint 203. The universal joint 203 connects the post 202 to a center or balance point of a bed frame 234 and acts as a pivot point for the bed frame. Attachment points 206, 208, 210, and 212 on the post 202 are sleeve bearings or other rotatable bearings. Attached to each of these sleeve bearings is a combination motor M and linear actuator 214, 216, 218, and 220. An opposing end of each of the linear actuators is attached to a sleeve bearing 222, 224, 226, and 228 which is securely attached to the bed frame 234.

According to this embodiment, the bed frame 234 is pivoted back and forth around a first axis by one of the pairs of linear actuators 214, 216 and is pivoted about a second axis orthogonal to the first axis by a second pair of linear actuators 218, 220. According to an alternative embodiment of the self-stabilized bed 200 of FIGS. 14 and 15, two or three linear actuators may be used for rotation of the bed frame 234 about two axes.

Attached to the bed frame 234 is a platform 230 which is a one or more sided platform for supporting a doctor or a surgeon. The platform 230 may vary in size and shape to accommodate one or more persons as well as medical equipment. Structural cross members 232 are added to the platforms 230 for additional strength as required. The bed frame 234 may also support various attachments such as surgical instrument platforms and equipment stands which are also stabilized due to their attachment to the bed frame structure 234. The bed 200 is controlled by a control box 240 which receives information from the sensor packages A and B and controls the motors M of the linear actuators.

While the invention has been described in detail with reference to the preferred embodiments thereof, it will be apparent to one skilled in the art that various changes and modifications can be made and equivalents employed, without departing from the present invention.

What is claimed is:

1. A stabilized platform comprising:
    a payload platform for supporting an article to be stabilized;
    a base;
    a stabilizing system connected between the payload platform and the base, the stabilizing system including means for moving the payload platform with respect to the base about two different axes for providing the payload platform with stabilization in two dimensions;
    a first sensor package for determining, in two transverse directions, motion of a moving object on which the stabilized platform is mounted;
    a second sensor package comprising sensor means for sensing a position of the payload platform and for providing information based on the position of the payload platform relative to a predetermined position; and
    a control system connected to the means for moving for stabilizing the platform in response to information provided by the first sensor package and the second sensor package, wherein the second sensor package is fixed to the payload platform, and the first sensor package is fixed with respect to the base.

2. The stabilized platform of claim 1, wherein the control system compensates for errors in the first sensor package using information obtained from the second sensor package.

3. The stabilized platform of claim 1, wherein the second sensor package includes two level sensors for sensing a position of the payload platform in two perpendicular directions.

4. The stabilized platform of claim 1, wherein the second sensor package is mounted on the payload platform.

5. The stabilized platform of claim 1, further comprising a camera mounted on a payload platform.

6. The stabilized platform of claim 1, further comprising at least one of a chair and a table mounted on the payload platform.

7. The stabilized platform of claim 1, wherein the means for moving the payload platform comprises three motors for rotating the payload platform about three perpendicular axes of rotation.

8. The stabilized platform of claim 7, wherein the first sensor package includes sensors for determining rate of rotation about three perpendicular axes.

9. The stabilized platform of claim 1, wherein a universal camera mount is mounted on the payload platform and a camera is mounted on the camera mount, the camera mount allowing hands on control of the camera by a camera operator and stabilization of the camera with the stabilized platform.

10. The stabilized platform of claim 1, wherein the second sensor means comprises at least two level sensors for sensing differences in level about at least two transverse axes relative to the predetermined position.

11. The stabilized platform of claim 1, wherein the information provided by the first set of sensors results in drift over time of the position of the payload platform from the predetermined position, and the means for moving, in response to information provided by the second set of sensors to the control system, corrects the drift and moves the platform back to the predetermined position.

12. The stabilized platform of claim 1, wherein the control system responds to information from the first sensor package at a rate of at least as fast as about one hundred times per second and the control system responds to information from the second sensor package at a rate of about once per second to about once per minute.

13. The stabilized platform of claim 1, wherein the information provided by the first set of sensors results in drift over time of the position of the payload platform from the predetermined position, and the means for moving, in response to information provided by the second sensor package to the control system, corrects the drift and moves the platform back to the predetermined position.

14. A method of stabilizing and self correcting a camera platform comprising:
    positioning a stabilized camera platform on a moving object;
    stabilizing the payload platform in at least two dimensions based on information collected by a first sensor package sensing motion of the moving object independent of motion of the payload platform;
    sensing by a second sensor package a position of the payload platform relative to a predetermined position; and self correcting the position of the payload platform to the predetermined position based on information collected by the second sensor package.

15. The method of claim 14, wherein the position of the platform is subject to drift over time from stabilization of the platform in response to the first sensor package, and the step of self correcting based on information provided by the second sensor package corrects for the drift.

16. The method of claim 14, wherein the step of stabilizing based on the information provided by the first sensor package comprises sensing motion of the moving object independent of the motion of the platform, and the step of self correcting based on the information provided by the second sensor package, comprises a step of sensing the position of the platform.

17. The method of claim 14, wherein the step of stabilizing is performed by moving the platform in response to information provided by the first sensor package, and the step of self correcting is performed by moving the platform in response to the information provided by the second sensor package, and the step of stabilizing is performed more often than the step of self correcting.

18. The method of claim 17, wherein the step of stabilizing in response to information provided by the first package is at a rate of at least as fast as about one hundred times per second, and the step of self correcting is in response to information provided by the second sensor package at a rate of about once per second to about once per minute.

19. The method of claim 14, wherein the step of stabilizing results in drift of the position of the platform relative to the predetermined position, and in the step of self correcting, the drift is corrected by sensing the position of the platform.

20. The method of claim 14, wherein there is a step of fixing the second sensor package to the payload platform prior to the step of sensing with the second sensor package.

21. The method of claim 20, wherein the information collected by the second sensor package is collected by a plurality of level sensors.

22. The method of claim 21, wherein in the step of stabilizing, the first sensor package comprises two rate sensors for sensing a rate of motion of the moving object.

23. The method of claim 20, wherein the stabilized platform is self corrected in two dimensions.

24. The method of claim 20, further comprising controlling a camera mounted on the platform by hands on operator control.

25. The method of claim 20, wherein the position of the platform is subject to drift over time from stabilization of the platform in response to the first sensor package, and the step of self correcting based on information provided by the second sensor package corrects for the drift.

26. The method of claim 20, wherein the step of stabilizing based on the information provided by the first sensor package comprises sensing motion of the moving object independent of the motion of the platform, and the step of self correcting based on the information provided by the second sensor package, comprises a step of sensing the position of the platform.

27. The method of claim 20, wherein the step of stabilizing is performed by moving the platform in response to information provided by the first sensor package, and the step of self correcting is performed by moving the platform in response to the information provided by the second sensor package, and the step of stabilizing is performed more often than the step of self correcting.

28. The method of claim 20, wherein the step of stabilizing results in drift of the position of the platform relative to the predetermined position, and in the step of self correcting, the drift is corrected by sensing the position of the platform.

29. A stabilized platform comprising:
a payload platform for supporting an article to be stabilized;
a base;
a stabilizing system connected between the payload platform and the base, the stabilizing system including means for moving the payload platform with respect to the base about two different axes for providing the payload platform with stabilization in two dimensions;
a first sensor package for determining, in two transverse directions, motion of a moving object on which the stabilized platform is mounted;
a second sensor package comprising sensor means fixed to the payload platform for providing information based on a position of the payload platform relative to a predetermined position; and
a control system connected to the means for moving for stabilizing the platform in response to information provided by the first sensor package and the second sensor package, wherein the information provided by the first sensor package is independent of the stabilization of the platform provided by the means for moving, and the position of the platform is subject to drift over time from stabilization thereof based on information provided by the first sensor package, and wherein the control system responds to information provided by the second sensor package to correct for the drift from the predetermined position, and the first sensor package comprises rate of motion sensors and the sensor means comprises level sensors.

30. A stabilized platform comprising:
a payload platform for supporting an article to be stabilized;
a base;
a stabilizing system connecting the payload platform to the base, the stabilizing system including at least two motors for rotating the payload platform with respect to the base about two perpendicular axes of rotation providing the payload platform with stabilization in two dimensions;
a first sensor package fixed to said base for determining motion of a vehicle on which the stabilized platform is mounted in two perpendicular directions,
a second sensor package including at least one level sensor fixed to the payload platform; and
a control system for continuously stabilizing the platform based on information provided by the first sensor package and correcting for first sensor package anomalies based on information provided periodically by the second sensor package.

31. A method of stabilizing and self correcting a camera platform comprising:
positioning a stabilized camera platform on a moving vehicle;
continuously stabilizing the platform in at least two dimensions based on information collected by a first sensor package fixed relative to the moving vehicle and sensing motion of the moving vehicle; and
periodically self correcting a position of the platform based on information collected by a second sensor package including a level sensor and mounted on the platform.

32. A stabilized platform comprising:
a payload platform for supporting an article to be stabilized;

a base;

a stabilizing system connected between the payload platform and the base, the stabilizing system including means for moving the payload platform with respect to the base about two different axes for providing the payload platform with stabilization in two dimensions;

a first sensor package for determining, in two transverse directions, motion of a moving object on which the stabilized platform is mounted;

a second sensor package comprising sensor means for sensing a position of the payload platform and for providing information based on the position of the payload platform relative to a predetermined position; and a control system connected to the means for moving for stabilizing the platform in response to information provided by the first sensor package and the second sensor package, wherein the second sensor package is fixed to the payload platform, and wherein the control system allows a user to set an initial payload platform position and provides self correction of the platform to the initial position.

33. A stabilized platform comprising:

a payload platform for supporting an article to be stabilized;

a base;

a stabilizing system connected between the payload platform and the base, the stabilizing system including means for moving the payload platform with respect to the base about two different axes for providing the payload platform with stabilization in two dimensions;

a first sensor package for determining, in two transverse directions, motion of a moving object on which the stabilized platform is mounted;

a second sensor package comprising sensor means for sensing a position of the payload platform and for providing information based on the position of the payload platform relative to a predetermined position; and a control system connected to the means for moving for stabilizing the platform in response to information provided by the first sensor package and the second sensor package, wherein the second sensor package is fixed to the payload platform, and wherein the control system responds to information from the first sensor package at a rate of at least as fast as about one hundred times per second and the control system responds to information from the second sensor package at a rate of about once per second to about once per minute.

34. A stabilized platform comprising:

a payload platform for supporting an article to be stabilized;

a base;

a stabilizing system connected between the payload platform and the base, the stabilizing system including means for moving the payload platform with respect to the base about two different axes for providing the payload platform with stabilization in two dimensions;

a first sensor package for determining, in two transverse directions, motion of a moving object on which the stabilized platform is mounted;

a second sensor package comprising sensor means for sensing a position of the payload platform and for providing information based on the position of the payload platform relative to a predetermined position; and a control system connected to the means for moving for stabilizing the platform in response to information provided by the first sensor package and the second sensor package, wherein the second sensor package is fixed to the payload platform, and wherein the information provided by the first sensor package is independent of the stabilization of the payload platform provided by the means for moving, and the information provided by the second sensor package is dependent upon the stabilization of the payload platform.

35. A stabilized platform comprising:

a payload platform for supporting an article to be stabilized;

a base;

a stabilizing system connected between the payload platform and the base, the stabilizing system including means for moving the payload platform with respect to the base about two different axes for providing the payload platform with stabilization in two dimensions;

a first sensor package for determining, in two transverse directions, motion of a moving object on which the stabilized platform is mounted;

a second sensor package comprising sensor means for sensing a position of the payload platform and for providing information based on the position of the payload platform relative to a predetermined position; and a control system connected to the means for moving for stabilizing the platform in response to information provided by the first sensor package and the second sensor package, wherein the second sensor package is fixed to the payload platform, and wherein the f sensor package comprises sensors for sensing a different type of information from the sensor means in the second sensor package.

36. The stabilized platform of claim 35, wherein the first sensor package includes sensors for determining rate of rotation about three perpendicular axes.

37. The stabilized platform of claim 35, wherein the second sensor means comprises at least two level sensors for sensing differences in level about at least two transverse axes relative to the predetermined position.

38. A stabilized platform comprising:

a payload platform for supporting an article to be stabilized;

a base;

a stabilizing system connected between the payload platform and the base, the stabilizing system including means for moving the payload platform with respect to the base about two different axes for providing the payload platform with stabilization in two dimensions;

a first sensor package for determining, in two transverse directions, motion of a moving object on which the stabilized platform is mounted;

a second sensor package comprising sensor means for sensing a position of the payload platform and for providing information based on the position of the payload platform relative to a predetermined position; and a control system connected to the means for moving for stabilizing the platform in response to information provided by the first sensor package and the second sensor package, wherein the control system responds to information from the first sensor package more often than the control system responds to information from the second sensor package.

* * * * *

US006611662C1

(12) INTER PARTES REEXAMINATION CERTIFICATE (0200th)
United States Patent
Grober

(10) Number: US 6,611,662 C1
(45) Certificate Issued: Nov. 2, 2010

(54) AUTONOMOUS, SELF LEVELING, SELF CORRECTING STABILIZED PLATFORM

(76) Inventor: David E. Grober, 616 Venice Blvd., Marina del Rey, CA (US) 90291

Reexamination Request:
No. 95/000,092, May 5, 2005

Reexamination Certificate for:
Patent No.: 6,611,662
Issued: Aug. 26, 2003
Appl. No.: 09/579,723
Filed: May 26, 2000

Related U.S. Application Data
(60) Provisional application No. 60/136,756, filed on May 28, 1999.

(51) Int. Cl.
*G03B 17/00* (2006.01)

(52) U.S. Cl. .......................... 396/55; 396/421
(58) Field of Classification Search ............... None
See application file for complete search history.

(56) References Cited

U.S. PATENT DOCUMENTS

| | | | |
|---|---|---|---|
| 2,603,767 A | 7/1952 | Ferrill | |
| 3,811,329 A | 5/1974 | White | |
| 3,840,265 A | 10/1974 | Stirling | |
| 4,070,674 A | 1/1978 | Buell et al. | |
| 4,143,312 A | 3/1979 | Duckworth et al. | |
| 4,893,066 A | 1/1990 | Stewart et al. | |
| 4,930,435 A | 6/1990 | Newman | |
| 5,050,087 A | 9/1991 | Walrath et al. | |
| 5,124,938 A | 6/1992 | Algrain | |
| 5,227,806 A | 7/1993 | Eguchi | |
| 5,332,136 A | 7/1994 | Rudolph | |
| 5,868,031 A | 2/1999 | Kokush | |
| 5,922,039 A | 7/1999 | Welch et al. | |
| 6,263,160 B1 | 7/2001 | Lewis | |

FOREIGN PATENT DOCUMENTS

EP   0135008   3/1985

OTHER PUBLICATIONS

Panaflex, Produce Brochure for Panaflex products.
Tyler, Product Brochure and price sheet for Tyler Camera Systems.

*Primary Examiner*—Minh T Nguyen

(57) ABSTRACT

A stabiilzed platform is stabilized to compensate for motion caused by waves, currents, wind, and other motion during land, air and sea operations of a camera. Although the stabilized platform is primarily described as useful for supporting a camera, the platform may be used to support other articles or persons. The stabilized platform includes a stabilizing system connecting a payload platform to a base. The stabilizing system including at least two motors for rotating the payload platform with respect to the base about two perpendicular axes of rotation providing the payload platform with stabilization in two dimensions. A control system stabilizes the platform based on information provided by a first sensor package or other location for sensing motion of the vehicle and a second sensor package on the platform. The use of the second sensor package allows the stabilized platform to be self correcting. A camera when mounted on the payload platform may be manually or remotely controlled.

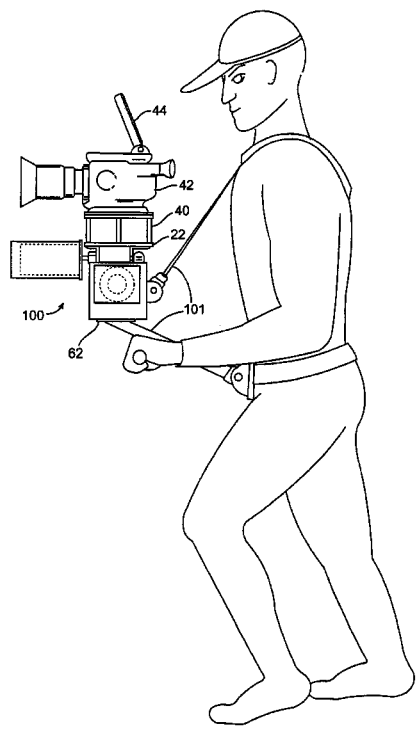

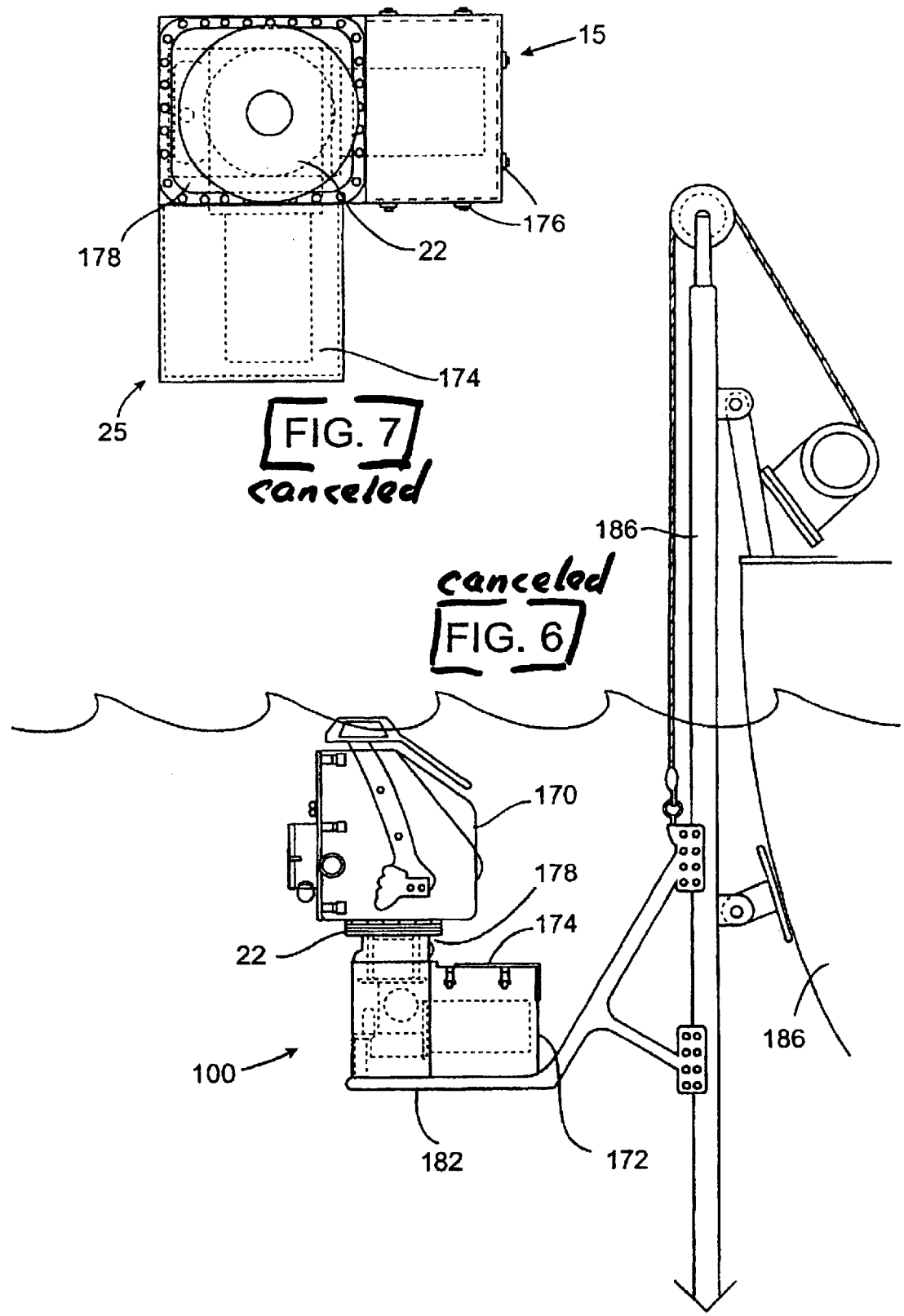

canceled canceled cancelled

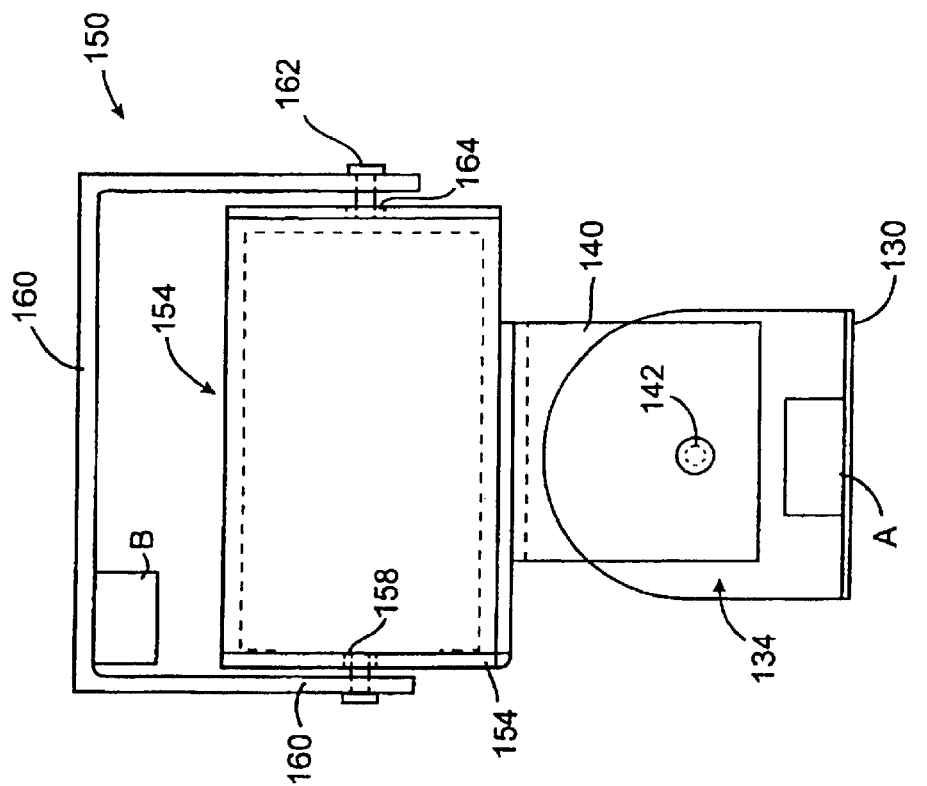
FIG. 11 canceled
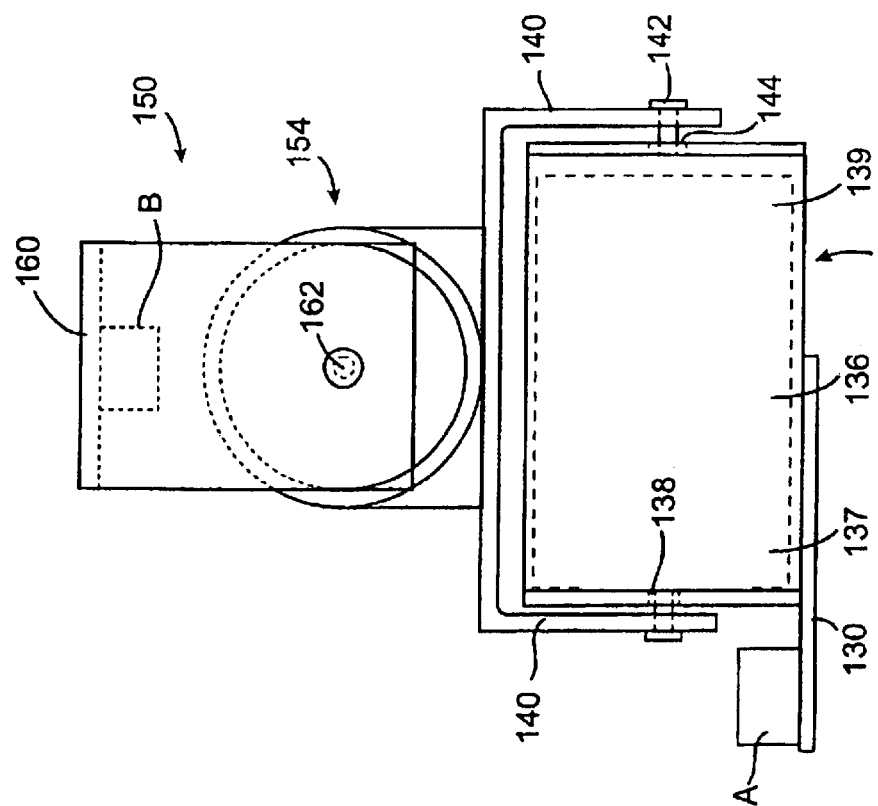
FIG. 12 canceled

US 6,611,662 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Figure 9:
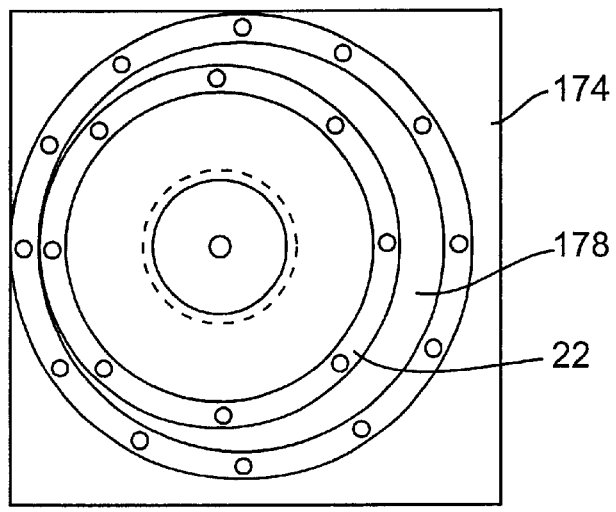
FIG. 9 is an enlarged top view of a portion of the stabilized platform of FIG. 8.

Column 2, lines 48-62:

[FIG. 6 is a side view of a two axis stabilized platform and camera mounted on an underwater rail on the side of a boat;

FIG. 7 is a top view of the two axis stabilized platform of FIG. 6;

FIG. 8 is an enlarged side view of the stabilized platform of FIG. 6;

FIG. 9 is an enlarged top view of a portion of the stabilized platform of FIG. 8;

FIG. 10 is a perspective view of an alternative embodiment of a two axis stabilized platform;

FIG. 11 is a front view of the stabilized platform of FIG. 10;

FIG. 12 is a left side view of the stabilized platform of FIG. 10;]

Column 5, lines 6-13:

One example of a stabilized platform 100 for use on boats and other vehicles has the capability of compensating for pitch and roll motions of about 70 to about 90 degrees, weighs less than about 40 pounds, and accepts payloads of at least 100 pounds, preferably, at least 150 pounds. The stabilized platform 100 when designed for [us] *use* with aircraft, preferably has the capability of compensating for pitch, roll, and yaw motion of 360 degrees.

Column 5, lines 40-63:

[An alternative embodiment of the two axis stabilized platform 150 is illustrated in FIGS. 10-12. In this internal embodiment, the drive mechanisms are in a stacked arrangement for a more compact system in a width dimension which may be slightly larger in a height direction in the orientation illustrated in FIG. 10. According to this embodmient, a base plate bracket 130 is attached to a first drive mechanism 134 including a motor, a gear box, and encoder. A drive shaft 142 of the motor supports a first platform 140 on which is mounted a second drive mechanism 154 having an orientation which is orthogonal to the first drive mechanism 134. A drive shaft 162 of the second drive mechanism 154 supports the camera mount platform 160. Bearings 138, 144, 158, 164 are provided in the motor housings for supporting the drive shafts 142, 162.

According to this embodiment, the payload, such as a camera, is attached to the payload or camera platform 160. A first sensor package A is attached to the base plate bracket 130 while a second sensor package B is attached to the camera or payload platform 160 for operation in the manner described above. The stabilized platform 150 according to FIGS. 10-12 can be placed vertically as shown, horizontally, or inverted as well as other angled orientations.]

Column 5, line 64-Column 6, line 5:

The stabilized platform 100, [150] according to the present invention allows hands on or remote operation of the camera on the camera platform 22. For hands-on operation, a universal camera mount is mounted between the platform 22 and the camera. The universal camera mount provides the ability to move the camera in three dimensions while the platform 22 remains stable. This option of hands-on control of the camera is not available in any of the known stabilized camera platforms.

Column 6, lines 10-24:

In addition to supporting the stabilized platform on a vehicle, tripod, or other base, the base plate of the stabilized platform 100, [150] may be attached to a suitable body harness 101 to be worn by a camera operator or assistant, as shown in FIG. 4. When mounted on the body harness 101, the stabilized platform 100 provides stabilization of the motion of the person in two or three directions during use of the camera. A camera 42, as illustrated in FIG. 4, may be mounted on the stabilized platform 100. An optional riser 40 may be provided between the stabilized platform and the camera 42 or between the stabilized platform and the harness 101 to adjust a height of the camera 42 for ease of use. The camera 42 may be provided with an external monitor 44 allowing for improved ease of viewing by the operator.

Column 6, lines 40-62:

[FIG. 6 illustrates a stabilized platform 100 and attached camera 170 in one example of an underwater application. As shown in FIGS. 6-8, the stabilized platform of FIG. 1 is shown encased in a waterproof hosing which is generally a form fitting waterproof case 172 which fits around the stabilized platform. A lid 174 of the waterproof case is provided with a plurality of tension latches 176 and an O-ring (not shown) which is compressed between the lid and the case upon closure of the latches to prevent water from entering the case. A rubberized boot 178 is attached to one side of the lid 174. An opposite end of the rubberized boot 178 is sealed to an underside of the payload platform 22 forming a water tight seal between the payload platform and waterproof case 172. A sealed underwater camera 170 is attached to the payload platform 22.

In operation of the embodiment of FIGS. 6-9, the camera 170 and stabilized platform 100 can be mounted on a shelf 182 which is movable on a rail 184 on the exterior of a vehicle such as a boat 186. As shown in FIG. 6, the camera 170 can be lowered down the rail 184 from a pitching, rocking boat, and the stabilized platform 100 will maintain the camera with a stabile horizon as it moves from above to below the surface of the water.]

THE DRAWING FIGURES HAVE BEEN CHANGED AS FOLLOWS:

FIGS. 6-12 are deleted.

AS A RESULT OF REEXAMINATION , IT HAS BEEN DETERMINTED THAT:

The patentability of claims 1-8, 10-13, 15-20, 22, 26-34 and 36-38 is confirmed.

Claims 9, 14, 21, 23-25 and 35 are determined to be patentable as amended.

New claims 39-67 are added and determined to be patentable.

9. The stabilized platform of claim 1, wherein a universal camera mount is mounted on the payload platform and a camera is mounted on the camera mount, the camera mount allowing [hands on] *hands-on* control of the camera by a camera operator and stabilization of the camera with the stabilized platform.

14. A method of stabilizing and self correcting a camera platform comprising:
positioning a stabilized camera platform on a moving object;
stabilizing the payload platform in at least two dimensions based on information collected by a first sensor package sensing motion of the moving object independent of motion of the payload platform;
sensing by a second sensor package, *which is fixed to the payload platform,* a position of the payload platform relative to a predetermined position; and
self correcting the position of the payload platform to the predetermined position based on information collected by the second sensor package.

21. The method of claim [20] *14*, wherein the information collected by the second sensor package is collected by a plurality of level sensors.

23. The method of claim [20] *14*, wherein the stabilized platform is self corrected in two dimensions.

24. The method of claim [20] *14*, further comprising controlling a camera mounted on the platform by [hands on] *hands-on* operator control.

25. The method of claim [20] *14*, wherein the position of the platform is subject to drift over the time from stabilization of the platform in response to the first sensor package, and the step of self correcting based on information provided by the second sensor package corrects for the drift.

35. A stabilized platform comprising:
a payload platform for supporting an article to be stabilized;
a base;
a stabilizing system connected between the payload platform and the base, the stabilizing system including means for moving the payload platform with respect to the base about two different axes for providing the payload platform with stabilization in two dimensions;
a first sensor package for determining, in two transverse directions, motion of a moving object on which the stabilized platform is mounted;
a second sensor package comprising sensor means for sensing a position of the payload platform and for providing information based on the position of the payload platform relative to a predetermined position; and
a control system connected to the means for moving for stabilizing the platform in response to information provided by the first sensor package and the second sensor package, wherein the second sensor package is fixed to the payload platform, and wherein the [f] *first* sensor package comprises sensors for sensing a different type of information from the sensor means in the second sensor package.

39. *The stabilized platform of claim 1, further comprising controlling a camera mounted on the platform by hands-on operator control.*

40. *The stabilized platform of claim 1, further comprising controlling a camera mounted on the platform by hands-on operator control, and wherein the information provided by the first sensor package is independent of the stabilization of the payload platform provided by the means for moving.*

41. *The stabilized platform of claim 1, and further comprising controlling a camera mounted on the platform by hands-on operator control, and wherein the information provided by the first sensor package is independent of the stabilization of the payload platform provided by the means for moving, and including at least one of: a, b, c, or d, wherein:*
   *a.) stabilizing is performed by moving the platform in response to information provided by the first sensor package, and self correcting is performed by moving the platform in response to the information provided by the second sensor package, and stabilizing is performed more often than self correcting;*
   *b.) a control system for continuously stabilizing the platform based on information provided by the first sensor package and correcting for first sensor package anomalies based on information provided periodically by the second sensor package;*
   *c.) continuously stabilizing the platform in at least two dimensions based on information collected by the first sensor package, and periodically self correcting a position of the platform based on information collected by the second sensor package;*
   *d.) the control system responds to information from the first sensor package more often than the control system responds to information from the second sensor package.*

42. *The stabilized platform of claim 1, and further comprising controlling a camera mounted on the platform by hands-on operator control, and wherein the information provided by the first sensor package is independent of the stabilization of the payload platform provided by the means for moving, and wherein the first sensor package includes sensors for determining the rate of rotation about three perpendicular axes, and including at least one of: a, b, c, or d, wherein:*
   *a.) stabilizing is performed by moving the platform in response to information provided by the first sensor package, and self correcting is performed by moving the platform in response to the information provided by the second sensor package, and stabilizing is performed more often than self correcting;*
   *b.) a control system for continuously stabilizing the platform based on information provided by the first sensor package and correcting for first sensor package anomalies based on information provided periodically by the second sensor package;*
   *c.) continuously stabilizing the platform in at least two dimensions based on information collected by the first sensor package, and periodically self correcting a position of the platform based on information collected by the second sensor package;*
   *d.) the control system responds to information from the first sensor package more often than the control system responds to information from the second sensor package.*

43. *The stabilized platform of claim 1, and further comprising least one of a chair and a table mounted on the payload platform, and wherein the information provided by the first sensor package is independent of the stabilization of the payload platform provided by the means for moving, and including at least one of: a, b, c, or d; wherein:*
   *a.) stabilizing is performed by moving the platform in response to information provided by the first sensor* package, and self correcting is performed by moving the platform in response to the information provided by the second sensor package, and stabilizing is performed more often than self correcting;

b.) a control system for continuously stabilizing the platform based on information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responds to information from the first sensor package more often than the control system responds to information from the second sensor package.

44. The stabilized platform of claim 1 wherein the information provided by the first sensor package is independent of the stabilization of the payload platform provided by the means for moving.

45. The stabilized platform of claim 1, further comprising controlling a camera mounted on the platform by hands-on operator control, and wherein the information provided by the first sensor package is independent of the stabilization of the payload platform provided by the means for moving, and continuously stabilizing the platform based on information provided by the first sensor package, and correcting the position of the platform based on information provided periodically by the second sensor package.

46. The method of claim 14, further comprising controlling a camera mounted on the platform by hands-on operator control, and the first sensor package providing information that is independent of the stabilization of the payload platform provided by the means for moving.

47. The method of claim 14, and further comprising controlling a camera mounted on the platform by hands-on operator control, and the first sensor package providing information that is independent of the stabilization of the payload platform provided by the means for moving, and there is a step that includes at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) the control system continuously stabilizing the platform based on information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responding to information from the first sensor package more often than the control system responds to information from the second sensor package.

48. The method of claim 14, wherein the first sensor package is providing information that is independent of the stabilization of the payload platform provided by the means for moving, wherein the first sensor package includes sensors for determining the rate of rotation about three perpendicular axes, and the means for moving the payload platform comprises three motors rotating the payload platform about three perpendicular axes of rotation, and there is a step that includes at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) the control system continuously stabilizing the platform based on information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responds to information from the first sensor package more often than the control system responds to information from the second sensor package.

49. The method of claim 14, and further comprising mounting at least one of a chair or table on the payload platform, and the first sensor package providing information that is independent of the stabilization of the payload platform provided by the means for moving.

50. The method of claim 14, and mounting at least one of a chair on the payload platform, and controlling a camera mounted on the platform by hands-on operator control.

51. The method of claim 14 wherein the first sensor package is providing information that is independent of the stabilization of the payload platform provided by the means for moving.

52. The method of claim 14, further comprising controlling a camera mounted on the platform by hands-on operator control, and the first sensor package is providing information that is independent of the stabilization of the payload platform provided by the means for moving, and continuously stabilizing the platform based on information provided by the first sensor package, and correcting the position of the platform based on information provided periodically by the second sensor package.

53. The method of claim 14 including the step of mounting a universal camera mount on the payload platform, mounting a camera on the camera mount, and providing hands on control of the camera by a camera operator, and stabilizing the camera with the stabilized platform.

54. The method of claim 31, further comprising controlling a camera mounted on the platform by hands-on operator control.

55. The method of claim 31, further comprising controlling a camera mounted on the platform by hands-on operator control, and the step of the first sensor package providing information that is independent of the stabilization of the payload platform provided by the means for moving.

56. The method of claim 31, further comprising controlling a camera mounted on the platform by hands-on operator control, and the step of the first sensor package providing information that is independent of the stabilization of the payload platform provided by the means for moving, and the step including at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) the control system is continuously stabilizing the platform based on the information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responding to information from the first sensor package more often than the control system responds to information from the second sensor package.

57. The method of claim 31, and further comprising controlling a camera mounted on the platform by hands-on operator control, and the step of the first sensor package providing information that is independent of the stabilization of the payload platform provided by the means for moving, and the first sensor package includes sensors for determining the rate of rotation about three perpendicular axes, and there is the step including at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) the control system is continuously stabilizing the platform based on the information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responding to information from the first sensor package more often than the control system responds to information from the second sensor package.

58. The method of claim 31 further comprising mounting at least one of a chair or table on the payload platform.

59. The method of claim 31 wherein the first sensor package is providing information that is independent of the stabilization of the payload platform provided by the means for moving.

60. The method of claim 31 including the step of mounting a universal camera mount on the payload platform, mounting a camera on the camera mount, and providing hands on control of the camera by a camera operator, and stabilizing the camera with the stabilized platform.

61. The stabilized platform of claim 32, further comprising controlling a camera mounted on the platform by hands-on operator control.

62. The stabilized platform of claim 32, further comprising controlling a camera mounted on the platform by hands-on operator control, and wherein the information provided by the first sensor package is independent of the stabilization of the payload platform provided by the means for moving.

63. The stabilized platform of claim 32, and further comprising controlling a camera mounted on the platform by hands-on operator control, wherein the information provided by the first sensor package is independent of the stabilization of the payload platform provided by the means for moving, and including at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) a control system for continuously stabilizing the platform based on information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responds to information from the first sensor package more often than the control system responds to information from the second sensor package.

64. The stabilized platform of claim 32, and further comprising controlling a camera mounted on the platform by hands-on operator control, and wherein the information provided by the first sensor package is independent of the stabilization of the payload platform provided by the means for moving, and wherein the first sensor package includes sensors for determining the rate of rotation about three perpendicular axes, and including at least one of: a, b, c, or d, wherein:

a.) stabilizing is performed by moving the platform in response to information provided by the first sensor package, and self correcting is performed by moving the platform in response to the information provided by the second sensor package, and stabilizing is performed more often than self correcting;

b.) a control system for continuously stabilizing the platform based on information provided by the first sensor package and correcting for first sensor package anomalies based on information provided periodically by the second sensor package;

c.) continuously stabilizing the platform in at least two dimensions based on information collected by the first sensor package, and periodically self correcting a position of the platform based on information collected by the second sensor package;

d.) the control system responds to information from the first sensor package more often than the control system responds to information from the second sensor package.

65. The stabilized platform of claim 32 further comprising at least one of a chair and a table mounted on the payload platform.

66. The stabilized platform of claim 32 wherein the information provided by the first sensor package is independent

*of the stabilization of the payload platform provided by the means for moving.*

*67. The stabilized platform of claim 32, further comprising controlling a camera mounted on the platform by hands-on operator control, and wherein the information provided by the first sensor package is independent of the stabilization of the payload platform provided by the means for moving, and continuously stabilizing the platform based on information provided by the first sensor package, and correcting the position of the platform based on information provided periodically by the second sensor package.*

\* \* \* \* \*